(12) United States Patent
Kissell et al.

(10) Patent No.: US 12,459,887 B2
(45) Date of Patent: Nov. 4, 2025

(54) ACETONITRILE SEPARATION PROCESS

(71) Applicant: Ascend Performance Materials Operations LLC, Houston, TX (US)

(72) Inventors: Kyle Kissell, Houston, TX (US); Basil Michaels, Houston, TX (US)

(73) Assignee: Ascend Performance Materials Operations LLC, Houston, TX (US)

( * ) Notice: Subject to any disclaimer, the term of this patent is extended or adjusted under 35 U.S.C. 154(b) by 557 days.

(21) Appl. No.: 17/668,830

(22) Filed: Feb. 10, 2022

(65) Prior Publication Data

US 2022/0251030 A1 Aug. 11, 2022

Related U.S. Application Data

(60) Provisional application No. 63/148,361, filed on Feb. 11, 2021.

(51) Int. Cl.
*C07C 253/34* (2006.01)
*B01D 3/10* (2006.01)

(52) U.S. Cl.
CPC ............ *C07C 253/34* (2013.01); *B01D 3/10* (2013.01)

(58) Field of Classification Search
CPC ... C07C 253/34; C07C 255/03; C07C 253/32; B01D 3/10
See application file for complete search history.

(56) References Cited

U.S. PATENT DOCUMENTS

| | | | |
|---|---|---|---|
| 4,308,108 A | 12/1981 | Higuchi et al. | |
| 4,362,603 A | 12/1982 | Presson et al. | |
| 5,629,443 A * | 5/1997 | Nakamura | C07C 253/34 |
| | | | 558/435 |
| 6,780,289 B2 * | 8/2004 | Godbole | C07C 253/34 |
| | | | 203/99 |
| 2020/0157044 A1 | 5/2020 | Michael et al. | |

FOREIGN PATENT DOCUMENTS

| | | | | |
|---|---|---|---|---|
| CN | 109704990 A | | 5/2019 | |
| GB | 2027706 A | * | 2/1980 | ............ C07C 253/34 |
| JP | 2004-339111 A | | 12/2004 | |
| JP | 2004-339112 A | | 12/2004 | |
| WO | 02/06212 A2 | | 1/2002 | |
| WO | 2005/044783 A2 | | 5/2005 | |

OTHER PUBLICATIONS

Asmaiqbal et al., "Overview of Enhanced Distillations", International Journal of Advance in Science and Engineering, Nov. 1, 2015, pp. 263-270.
Zhu et al., "Separation of acetonitrile/methanol/benzene ternary azeotrope via triple col. pressure-swing distillation", Separation And Purification Technology, vol. 169, 2016, pp. 66-77.

* cited by examiner

*Primary Examiner* — Joseph K McKane
*Assistant Examiner* — Meghan C Heasley
(74) *Attorney, Agent, or Firm* — Womble Bond Dickinson (US) LLP (57) ABSTRACT

Provided herein are processes for the separation of acetonitrile from low-purity feedstock streams. The provided processes are particularly useful for isolating acetonitrile at high purity from chemical manufacturing waste streams that include methanol, water, and allyl alcohol.

16 Claims, 2 Drawing Sheets

ACETONITRILE SEPARATION PROCESS

CROSS REFERENCE TO RELATED APPLICATIONS

This application claims priority to U.S. Provisional Application No. 63/148,361, filed Feb. 11, 2021, which is incorporated herein by reference.

FIELD

The present disclosure relates generally to downstream separation processes having the ability to isolate acetonitrile, and which are particularly useful for the recovery of acetonitrile from industrial streams that include methanol, water, allyl alcohol, and oxazole.

BACKGROUND

Cyanocarbons, e.g., organic compounds having cyano functional groups, are known and are widely used in various applications. Many of these compounds, including acrylonitrile, are used as monomers to prepare various polymers, such as nylon, polyacrylonitrile, or acrylonitrile butadiene styrene. Several methods of producing cyanocarbons are known in the art, and these production methods often yield waste streams comprising small amounts of desirable co-products. For example, acetonitrile may be present in many of the conventional waste streams of industrial production processes. Typically, this co-product acetonitrile may be recovered using well-known separation schemes. These typical acrylonitrile process waste stream separation schemes, however, do not contemplate the presence of some other impurities in the waste streams, e.g., methanol, water, allyl alcohol, and/or oxazole, which can complicate acetonitrile isolation due to, e.g., the formation of an azeotrope with acetonitrile.

A number of processes for recovering acetonitrile are known in the art. For example, U.S. Pat. No. 4,362,603 discloses a process for recovering an acetonitrile byproduct from a stream comprising acetonitrile, water, hydrogen cyanide, acrylonitrile, and other organics such as oxazole, allyl alcohol, acetone, or propionitrile by distilling in three distillation zones at varying pressures.

As another example, U.S. Pat. No. 6,780,289 discloses a method for the purification of crude acetonitrile comprising distilling the crude acetonitrile in a first fractional distillation column at below atmospheric pressure, withdrawing a first side draw fraction comprising acetonitrile, distilling the first side draw fraction in a second fractional distillation column at super atmospheric pressure, and withdrawing from the second distillation a second side draw fraction comprising purified acetonitrile.

While these references may relate to acetonitrile separation, these references fail to contemplate the challenges of recovering acetonitrile from feedstock streams that comprise particular concentrations of, for example, methanol, water, allyl alcohol, and/or oxazole. Thus, the need exists for improved processes having more effective separation and/or recovery of by-product acetonitrile from methanol-, water-, oxazole-, and allyl alcohol-containing production process waste streams.

SUMMARY

In one aspect, the disclosure is to a process for producing acetonitrile. The process includes dehydrating a feedstock stream containing acetonitrile, allyl alcohol, water, and optional other components such as methanol, to produce a dehydrated stream including allyl alcohol and less than 1 wt % water. In some embodiments, the feedstock stream includes more than 0.02 wt % allyl alcohol. In some embodiments, the feedstock stream includes more than 38 wt % water. In some embodiments, the feedstock stream further includes hydrogen cyanide. In some embodiments, the feedstock stream includes less than 0.2 wt % cyanide. In some embodiments, the feedstock stream further includes methanol. In some embodiments, the feedstock stream further includes propionitrile. In some embodiments, the product acetonitrile stream includes more than 98 wt % acetonitrile. In some embodiments, the dehydrating of the feedstock stream includes distilling the feedstock stream in a dehydration distillation column to yield a dehydration distillate stream and a dehydration bottoms stream. In some embodiments, the dehydration distillation column is operated at a pressure less than 85 kPa. In some embodiments, the dehydrating further includes extracting the dehydration distillate stream to yield an extract stream and a raffinate stream. In some embodiments, the raffinate stream includes more than 0.08 wt % allyl alcohol. In some embodiments, the raffinate stream includes more than 0.4 wt % oxazole. In some embodiments, the raffinate stream is the dehydrated stream. In some cases, the extract stream comprises at greater than 0.01 wt % hydroxypropionitrile.

The process further includes reacting ally alcohol from the dehydrated stream with a strong acid in a reactor to yield a reactor output stream. In some embodiments, the reactor output stream includes less than 7 ppm allyl alcohol. In some embodiments, the allyl alcohol in the dehydrated stream reacts with the strong acid to form protonated salt species. In some embodiments, the reactor output stream includes greater than 0.01 wt % protonated salt species. In some embodiments, the strong acid includes sulfuric acid. In some embodiments, the mass ratio of the acetonitrile in the dehydrated stream to the water in the dehydrated stream is greater than 60:1. In some embodiments, the mass ratio of the acetonitrile in the reactor output stream to the allyl alcohol in the reactor output stream is greater than 100,000:1. In some embodiments, the dehydrated stream further includes oxazole. In some embodiments, the oxazole in the dehydrated stream reacts with the strong acid to form oxazole sulfate. In some embodiments, the reactor output stream includes greater than 0.01 wt % oxazole sulfate, e.g., greater than 0.1 wt % oxazole sulfate. In some embodiments the acrylonitrile is catalyzed, e.g., base-catalyzed, to form hydroxypropionitrile.

The distillation columns disclosed herein may be a suitable vessel, such as a tube that has surfaces for liquid-vapor transfer. This allows concentrating the more volatile components in the upper portion of the vessel, while less volatile components collect in the lower portion. The distillation columns described herein may be a distillation column, an extractive distillation column and/or an azeotropic distillation column. Suitable distillation columns, without limitation, include a plate column, a packed column, and others. Plate columns may include a perforated plate column, sieve trays, valve trays, bubble-cap column, Kittel tray column, uniflux tray, or a ripple tray column. For a plate column, the theoretical number of plates is not particularly limited and depending on the components to be separated, may include up to 80 plates, e.g., from 2 to 80, from 10 to 60, from 20 to 50, or more preferably from 25 to 40. The distillation column described herein may include a combination of features. For example, a combination of bubble-cap column and perforated plate column may be used as well as a combination of perforated plate column and a packed column. The distillation columns described herein may be operated in batch or continuous mode.

Distillation columns are made up of several components and internals to transfer heat energy and/or enhance liquid-vapor transfer. Such components may include the vessel walls, inlets/outlets, valves, condensers, receivers/tanks, pumps, reboilers, downcomers, weirs, and other internals to enhance component separation. Without limitation, the distillation column and its associated components may be made of suitable materials such as glass, metal, ceramic, or combinations thereof, and is not particularly limited to a specific one. More suitably the distillation column and its associated components made from a transition metal or a transition-metal-based alloy such as iron alloy, e.g., a stainless steel (Alloy 2205, Alloy 316/316L, or Alloy AL-6XN), nickel or nickel alloy, zirconium or zirconium alloy thereof, titanium or titanium alloy thereof, or aluminum alloy. Stainless steel alloys are sufficient materials for construction. In some embodiments, corrosion-resistant metals may be particularly suitable as materials for the distillation column and its associated components.

The process further includes purifying the reactor output stream to yield a product acetonitrile stream. In some embodiments, the purifying further includes distilling the reactor output stream in a lights removal distillation column to yield a lights removal distillate stream and a lights removal bottoms stream. In some embodiments, the purifying further includes distilling the lights removal bottoms stream in a heavies removal distillation column to yield the product acetonitrile stream. In some embodiments, the feedstock stream and the lights removal stream include methanol. In some embodiments, the lights removal distillate stream includes more than 15 wt % methanol.

In some embodiments, the process further includes treating an intermediate stream containing acetonitrile, hydrogen cyanide, and water in a digester to remove hydrogen cyanide and produce the feedstock stream. In some embodiments, sodium hydroxide is fed to the digester.

In another aspect, the process is to another process for producing acetonitrile. The process includes distilling a feedstock stream containing acetonitrile, allyl alcohol, and water in a dehydration distillation column to yield a dehydration distillate stream and a dehydration bottoms stream. The process further includes extracting the dehydration distillate stream to yield an extract stream and a raffinate stream. The process further includes distilling the raffinate stream in a lights removal distillation column to yield a lights removal distillate stream and a light removal bottoms stream containing allyl alcohol and less than 1 wt % water. The process further includes reacting allyl alcohol from the lights removal bottoms stream with a strong acid in a reactor to yield a reactor output stream containing less than 7 ppm allyl alcohol. The process further includes purifying the reactor output stream to yield a product output stream containing greater than 98 wt % acetonitrile. In some embodiments, the process further includes treating an intermediate stream containing acetonitrile, hydrogen cyanide, and water in a digester to remove hydrogen cyanide and produce the feedstock stream. In some embodiments, the process further includes distilling the reactor output stream in a heavies removal distillation column to yield the product acetonitrile stream.

BRIEF DESCRIPTION OF DRAWINGS

The present disclosure is described in detail below with reference to the appended drawings, wherein like numerals designate similar parts.

DETAILED DESCRIPTION

The present disclosure generally relates to acetonitrile separation processes that, when employed for example to isolate acetonitrile from industrial waste streams, provide advantageous improvements in producing an product acetonitrile stream at high purity and yield. For example, it would be beneficial for an acetonitrile separation process to have the ability to isolate acetonitrile from other components of an industrial waste stream, such as methanol, water, oxazole, and allyl alcohol. These components are commonly present in, for example, waste streams from acrylonitrile production processes that use methanol to favor the production of hydrogen cyanide and to contribute to acrylonitrile production efficiencies.

It has been difficult, however, for conventional acetonitrile separation processes to effectively isolate acetonitrile from contaminating components that include methanol, water, oxazole, and allyl alcohol. One reason for this is that some components, such as methanol and/or water, can detrimentally create azeotropes during distillation steps. In particular, the azeotrope of methanol and acetonitrile has a boiling point (63.5° C.) that is close to methanol (64.7° C.). It should be understood that other azeotropes may be present and cause inefficiencies during the distillation steps. This azeotrope formation in conventional separation processes can lead to significant problems that include reduced separation efficiencies, poor final acetonitrile product purities, and lower acetonitrile product yields. Other impurities in the feedstock stream can, due to their chemical structures and physical properties, also complicate the isolation of acetonitrile from the feedstock at purities and/or yields necessary for certain downstream applications. In particular, separation of allyl alcohol and/or oxazole is difficult because of the similarity in vapor pressure to that of acetonitrile. Also, the presence of acrylonitrile adds additional separation challenges.

The isolation of acetonitrile from particular streams, e.g., industrial waste streams, using specific separations schemes as disclosed herein advantageously results in significant quantities of high-purity acetonitrile product. In particular, the use of, inter alia, a reactor that employs a strong acid to consume allyl alcohol and/or oxazole provides a separation process having improved efficiencies, yielding acetonitrile product at a high purity, and alleviating further downstream separation burdens and associated costs. It has been found that the reaction with strong acid forms protonated salt species and/or oxazole sulfate from the allyl alcohol and/or oxazole. These reaction product have higher boiling points, and as such, have been found to separate out more easily than the allyl alcohol and/or oxazole. As a result, separation and purification of the acetonitrile stream is unexpectedly and significantly improved. The removal of allyl alcohol and oxazole impurities in the reactor of the disclosed separation schemes also leads to significant efficiency improvements in other unit operations, e.g., distillation columns, of the schemes. For example, the allyl alcohol and oxazole removal can contribute to unexpected efficiencies in the removal of impurities such as methanol, propionitrile, and/or acetone, in one or more columns downstream of the reactor.

The disclosed separation scheme further improves the efficiency of the reactor in removing allyl alcohol and/or oxazole by including stream dehydration steps, e.g., a distillation column and an extractor, to reduce the water content fed to the reactor. It is postulated that the presence of water above particular concentrations can promote the hydrolysis of strong acids, which has been found to have adverse effects on impurity removal. Higher concentrations of water can also promote the reversibility of allyl alcohol and oxazole degradation processes within the reactor, decreasing its efficiency in removing these impurities. Accordingly, the removal of water prior to the reaction with strong acid surprisingly results in significantly more effective removal of impurities, e.g., allyl alcohol and/or oxazole. Beneficially, any negative effects related to the reaction and extraction cost are more than outweighed by benefits related to resulting increases in, e.g., the purity and/or yield of the final isolated acetonitrile product. Notably, the importance of the combination the dehydration step, the reactor, the other separation scheme unit operations, and other process parameters disclosed herein had not been previously appreciated.

Processes

In one aspect, a process for isolating acetonitrile from a low-purity acetonitrile feedstock stream is disclosed. The acetonitrile of the feedstock stream has a low purity due to the presence of significant concentrations of other components, including water and allyl alcohol. The low purity of the acetonitrile in the feedstock stream can also be due to the presence of oxazole, hydrogen cyanide, methanol, and/or propionitrile in the stream. The provided acetonitrile separation process includes dehydrating this feedstock stream to remove a significant portion of the water and produce a dehydrated stream, reacting the dehydrated stream to remove at least a portion of the allyl alcohol and/or oxazole to produce a reactor output stream, and purifying this reactor output stream to yield a product acetonitrile stream including at least a portion of the acetonitrile at high purity. The combination of the dehydration and acid treatment steps unexpectedly provides for superior impurity removal, e.g., oxazole and/or allyl alcohol removal.

Feedstock Stream

The feedstock stream of the provided separation process includes, inter alia, acetonitrile, allyl alcohol, oxazole, and water. The feedstock stream can include one or more waste streams from other industrial chemical processes, e.g., the production of acrylonitrile, allyl cyanide, butyronitrile, polyacrylonitrile, polyamides, polyaramids, or combinations thereof. In some cases, the feedstock stream may result from the treatment of an intermediate stream in a digester to remove hydrogen cyanide, thus yielding the feedstock stream. For example, waste streams from multiple processes for producing organic nitriles or derivatives thereof can be combined (and optionally treated) to form the feedstock stream. In some embodiments, the feedstock stream includes one or more waste streams, e.g., purge streams, from an acrylonitrile production process. In conventional acryonitrile production processes, acetonitrile-containing waste streams are burned in waste heat boilers to suppress the formation of nitrogen oxides. This solution, however, fails to capture the by-product acetonitrile. In the processes disclosed herein, however, these waste streams can be processed to recover the acetonitrile, preferably in at a high purity level.

In some embodiments, the concentration of acetonitrile in the feedstock stream ranges from 1.7 wt % to 30 wt %, e.g., from 1.7 wt % to 9.5 wt %, from 2.3 wt % to 13 wt %, from 3 wt % to 17 wt %, from 4 wt % to 23 wt %, or from 5.4 wt % to 30 wt %. In terms of upper limits, the acetonitrile concentration in the feedstock stream can be less than 30 wt %, e.g., less than 23 wt %, less than 17 wt %, less than 13 wt %, less than 9.5 wt %, less than 7.1 wt %, less than 5.4 wt %, less than 4 wt %, less than 3 wt %, or less than 2.3 wt %. In terms of lower limits, the acetonitrile concentration in the feedstock stream can be greater than 1.7 wt %, e.g., greater than 2.3 wt %, greater than 3 w %, greater than 4 wt %, greater than 5.4 wt %, greater than 7.1 wt %, greater than 9.5 wt %, greater than 13 wt %, greater than 17 wt %, or greater than 23 wt %. Higher acetonitrile concentrations, e.g., greater than 30 wt %, and lower acetonitrile concentrations, e.g., less than 1.7 wt %, are also contemplated. Generally, as used herein, the weight percentages are based on the total weight of the respective stream. For example, with respect to the feedstock stream, the weight percentages include all components of the feedstock stream.

In some embodiments, the concentration of allyl alcohol in the feedstock stream ranges from 0.02 wt % to 2 wt %, e.g., from 0.02 wt % to 0.32 wt %, from 0.032 wt % to 0.5 wt %, from 0.05 wt % to 0.8 wt %, from 0.08 wt % to 1.3 wt %, or from 0.13 wt % to 2 wt %. In terms of upper limits, the allyl alcohol concentration in the feedstock stream can be less than 2 wt %, e.g., less than 1.3 wt %, less than 0.8 wt %, less than 0.5 wt %, less than 0.32 wt %, less than 0.2 wt %, less than 0.13 wt %, less than 0.08 wt %, less than 0.05 wt %, or less than 0.032 wt %. In terms of lower limits, the allyl alcohol concentration in the feedstock stream can be greater than 0.02 wt %, e.g., greater than 0.032 wt %, greater than 0.05 wt %, greater than 0.08 wt %, greater than 0.13 wt %, greater than 0.2 wt %, greater than 0.32 wt %, greater than 0.5 wt %, greater than 0.8 wt %, or greater than 1.3 wt %. Higher allyl alcohol concentrations, e.g., greater than 2 wt %, and lower allyl alcohol concentrations, e.g., less than 0.02 wt %, are also contemplated.

In some embodiments, the concentration of water in the feedstock stream ranges from 38 wt % to 98 wt %, e.g., from 38 wt % to 92 wt %, from 56 wt % to 94 wt %, from 69 wt % to 96 wt %, from 78 wt % to 97 wt %, or from 84 wt % to 98 wt %. In terms of upper limits, the water concentration in the feedstock stream can be less than 98 wt %, e.g., less than 97 wt %, less than 96 wt %, less than 94 wt %, less than 92 wt %, less than 89 wt %, less than 84 wt %, less than 78 wt %, less than 69 wt %, or less than 56 wt %. In terms of lower limits, the water concentration in the feedstock stream can be greater than 38 wt %, e.g., greater than 56 wt %, greater than 69 wt %, greater than 78 wt %, greater than 84 wt %, greater than 89 wt %, greater than 92 wt %, greater than 94 wt %, greater than 96 wt %, or greater than 97 wt %. Higher water concentrations, e.g., greater than 98 wt %, and lower water concentrations, e.g., less than 38 wt %, are also contemplated.

In some embodiments, the concentration of oxazole in the feedstock stream ranges from 0.09 wt % to 2.2 wt %, e.g., from 0.09 wt % to 0.61 wt %, from 0.12 wt % to 0.84 wt %, from 0.17 wt % to 1.2 wt %, from 0.23 wt % to 1.6 wt %, or from 0.32 wt % to 2.2 wt %. In terms of upper limits, the oxazole concentration in the feedstock stream can be less than 2.2 wt %, e.g., less than 1.6 wt %, less than 1.2 wt %, less than 0.84 wt %, less than 0.61 wt %, less than 0.44 wt %, less than 0.32 wt %, less than 0.23 wt %, less than 0.17 wt %, or less than 0.12 wt %. In terms of upper limits, the oxazole concentration in the feedstock stream can be greater than 0.09 wt %, e.g., greater than 0.12 wt %, greater than 0.17 wt %, greater than 0.23 wt %, greater than 0.32 wt %, greater than 0.44 wt %, greater than 0.61 wt %, greater than 0.84 wt %, greater than 1.2 wt %, or greater than 1.6 wt %.

Higher oxazole concentrations, e.g., greater than 2.2 wt %, and lower oxazole concentrations, e.g., less than 0.09 wt %, are also contemplated.

In some embodiments, the feedstock stream further includes hydrogen cyanide. The concentration of hydrogen cyanide in the feedstock stream can range, for example, from 0.0025 wt % to 0.25 wt %, e.g., from 0.0025 wt % to 0.04 wt %, from 0.004 wt % to 0.063 wt %, from 0.0063 wt % to 0.1 wt %, from 0.01 wt % to 0.16 wt %, or from 0.016 wt % to 0.25 wt %. In terms of upper limits, the hydrogen cyanide concentration in the feedstock stream can be less than 0.25 wt %, e.g., less than 0.16 wt %, less than 0.1 wt %, less than 0.063 wt %, less than 0.04 wt %, less than 0.025 wt %, less than 0.016 wt %, less than 0.01 wt %, less than 0.0063 wt %, or less than 0.004 wt %. In terms of lower limits, the hydrogen cyanide concentration in the feedstock stream can be greater than 0.0025 wt %, e.g., greater than 0.004 wt %, greater than 0.0063 wt %, greater than 0.01 wt %, greater than 0.016 wt %, greater than 0.025 wt %, greater than 0.04 wt %, greater than 0.063 wt %, greater than 0.1 wt %, or greater than 0.16 wt %. Higher hydrogen cyanide concentrations, e.g., greater than 0.25 wt %, and lower hydrogen cyanide concentrations, e.g., less than 0.0025 wt %, are also contemplated.

In some embodiments, the feedstock stream further includes methanol. In some cases the methanol is present in specific amounts. As a result, separation complications become more prevalent, e.g., in view of methanol-containing azeotrope formation. The concentration of methanol in the feedstock stream can range, for example, from 0.65 wt % to 14 wt %, e.g., from 0.65 wt % to 4.1 wt %, from 0.88 wt % to 5.6 wt %, from 1.2 wt % to 7.6 wt %, from 1.6 wt % to 10 wt %, or from 2.2 wt % to 14 wt %. In terms of upper limits, the methanol concentration in the feedstock stream can be less than 14 wt %, e.g., less than 10.3 wt %, less than 10 wt %, less than 7.6 wt %, less than 5.6 wt %, less than 4.1 wt %, less than 3 wt %, less than 2.2 wt %, less than 1.6 wt %, less than 1.2 wt %, or less than 0.88 wt %. In terms of lower limits, the methanol concentration in the feedstock stream can be greater than 0.65 wt %, e.g., greater than 0.88 wt %, greater than 1.2 wt %, greater than 1.6 wt %, greater than 2.2 wt %, greater than 3 wt %, greater than 4.1 wt %, greater than 5.6 wt %, greater than 7.6 wt %, or greater than 10 wt %. Higher methanol concentrations, e.g., greater than 14 wt %, and lower methanol concentrations, e.g., less than 0.65 wt %, are also contemplated.

In some embodiments, the feedstock stream further includes propionitrile. The concentration of propionitrile in the feedstock stream can range, for example, from 0.05 wt % to 1.1. wt %, e.g., from 0.05 wt % to 0.32 wt %, from 0.068 wt % to 0.44 wt %, from 0.093 wt % to 0.59 wt %, from 0.13 wt % to 0.81 wt %, or from 0.17 wt % to 1.1 wt %. In terms of upper limits, the propionitrile concentration in the feedstock stream can be less than 1.1 wt %, e.g., less than 0.81 wt %, less than 0.59 wt %, less than 0.44 wt %, less than 0.32 wt %, less than 0.23 wt %, less than 0.17 wt %, less than 0.13 wt %, less than 0.093 wt %, or less than 0.068 wt %. In terms of lower limits, the propionitrile concentration in the feedstock stream can be greater than 0.05 wt %, e.g., greater than 0.068 wt %, greater than 0.093 wt %, greater than 0.13 wt %, greater than 0.17 wt %, greater than 0.23 wt %, greater than 0.32 wt %, greater than 0.44 wt %, greater than 0.59 wt %, or greater than 0.81 wt %. Higher propionitrile concentrations, e.g., greater than 1.1 wt %, and lower propionitrile concentrations, e.g., less than 0.05 wt %, are also contemplated.

In some embodiments, the feedstock stream further includes acrylonitrile. The concentration of acrylonitrile in the feedstock stream can range, for example, from 0.05 wt % to 1.1. wt %, e.g., from 0.05 wt % to 0.32 wt %, from 0.068 wt % to 0.44 wt %, from 0.093 wt % to 0.59 wt %, from 0.13 wt % to 0.81 wt %, or from 0.17 wt % to 1.1 wt %. In terms of upper limits, the acrylonitrile concentration in the feedstock stream can be less than 1.1 wt %, e.g., less than 0.81 wt %, less than 0.59 wt %, less than 0.44 wt %, less than 0.32 wt %, less than 0.23 wt %, less than 0.17 wt %, less than 0.13 wt %, less than 0.093 wt %, or less than 0.068 wt %. In terms of lower limits, the acrylonitrile concentration in the feedstock stream can be greater than 0.05 wt %, e.g., greater than 0.068 wt %, greater than 0.093 wt %, greater than 0.13 wt %, greater than 0.17 wt %, greater than 0.23 wt %, greater than 0.32 wt %, greater than 0.44 wt %, greater than 0.59 wt %, or greater than 0.81 wt %. Higher acrylonitrile concentrations, e.g., greater than 1.1 wt %, and lower acrylonitrile concentrations, e.g., less than 0.05 wt %, are also contemplated.

In some embodiments, the feedstock stream further includes acetone. The concentration of acetone in the feedstock stream can range from 0.008 wt % to 0.2 wt %, e.g., from 0.008 wt % to 0.055 wt %, from 0.011 wt % to 0.076 wt %, from 0.015 wt % to 0.11 wt %, from 0.021 wt % to 0.14 wt %, or from 0.029 wt % to 0.2 wt %. In terms of upper limits, the acetone concentration in feedstock stream can be less than 0.2 wt %, e.g., less than 0.14 wt %, less than 0.11 wt %, less than 0.076 wt %, less than 0.055 wt %, less than 0.04 wt %, less than 0.029 wt %, less than 0.021 wt %, less than 0.015 wt %, or less than 0.011 wt %. In terms of lower limits, the acetone concentration in the feedstock stream can be greater than 0.008 wt %, e.g., greater than 0.011 wt %, greater than 0.015 wt %, greater than 0.021 wt %, greater than 0.029 wt %, greater than 0.04 wt %, greater than 0.055 wt %, greater than 0.076 wt %, greater than 0.11 wt %, or greater than 0.14 wt %. Higher acetone concentrations, e.g., greater than 0.2 wt %, and lower acetone concentrations, e.g., less than 0.008 wt %, are also contemplated.

In some embodiments, the feedstock stream further includes one or more other impurities, typically in small concentrations, e.g., ppm or ppb. These impurities can include, for example, various waste products that result from the production of organic nitriles and derivatives thereof. For example, the feedstock stream can include one or more acrylamides, azoles, aliphatic nitriles, aromatic nitriles, alcohols, aldehydes, acrolein, fumarin, acrylamide, cyanide salts, derivatives thereof, or a combination thereof Dehydration The feedstock stream of the provided separation process is dehydrated to remove a significant portion of the water from the feedstock stream, producing a dehydrated stream. As noted above, a low concentration of water in the dehydrated stream improves the efficiency of the (strong acid) reactor in removing allyl alcohol and/or oxazole. This then results in improved purities and yields for the final product acetonitrile stream. The dehydration step may be handled in many ways, as long as enough water removal is achieved, e.g., as long as a dehydrated stream having a suitably low water content is produced. In some cases, a single dehydration unit may be employed. In other cases, multiple units may be used to achieve the dehydration. In some embodiments, the concentration of water in the dehydrated stream ranges from 0 wt % to 25 wt %, e.g., from 0.01 wt % to 20 wt %, from 0.05 wt % to 20 wt %, from 0.1 wt % to 20 wt %, 0.12 wt % to 18 wt %, from 0.01 wt % to 1 wt %, from 0.05 wt % to 0.25 wt %, from 1 wt % to 18 wt %, from 5 wt % to 18 wt %, or from 10 wt % to 20 wt %. In terms of upper limits, the water concentration in the dehydrated stream can be less than 25 wt %, e.g., less than 20 wt %, less than 18 wt %, less than 16 wt %, less than 10 wt %, less than 5 wt %, less than 3 wt %, less than 1 wt %, less than 0.5 wt %, or less than 0.25 wt %. In terms of lower limits, the water concentration in the dehydrated stream can be greater than 0, e.g., greater than 0.01 wt %, greater than 0.05 wt %, greater than 0.1 wt %, greater than 0.5 wt %, greater than 1 wt %, greater than 5 wt %, or greater than 10 wt %. Higher water concentration, e.g., greater than 0.5 wt %, are also contemplated.

In some embodiments, the dehydrating includes distilling the feedstock stream in a dehydration distillation column to yield a dehydration distillate stream (this can be considered a dehydrated stream, which can then be reacted with strong acid) and a dehydration bottoms stream. The dehydration bottoms stream includes at least a portion of the water from the feedstock stream. The dehydration distillate stream includes at least a portion of the acetonitrile from the feedstock stream.

The structure of the dehydration distillation column can vary widely according to designs known to those of ordinary skill in the art, and any suitable column can be employed as long as the separation specifications described herein are achieved. For example the dehydration distillation column can include any suitable separation device or combination of separation devices. The dehydration distillation column can include a column, e.g., a standard distillation column, an extractive distillation column and/or an azeotropic distillation column. In some cases, the term "dehydration distillation column" may include one or more separate vessels, such as multiple distillation columns configured to operate in conjunction with one another.

The dehydration step generally (and the dehydration distillation column in particular) may be configured and operated such that the concentration of water in the dehydration distillate stream is less than that in the feedstock stream. It can be beneficial for the provided separation process to remove much of the water of the intermediate acetonitrile stream in the first distillation, rather than in later unit operations, to improve the strong acid reaction, to realize energy and cost efficiencies, and to provide a final product acetonitrile stream having a higher acetonitrile product purity. In particular, the removal of water prior to the reaction step of the overall separation process can minimize or prevent the reversibility of this reaction, improving its effectiveness in removing allyl alcohol and/or oxazole present in the dehydrated stream.

In some embodiments, the concentration of water in the dehydration distillate stream ranges from 3 wt % to 50 wt %, e.g., from 3 wt % to 16 wt %, from 4 wt % to 21 wt %, from 5.3 wt % to 28 wt %, from 7 wt % to 38 wt %, or from 9.2 wt % to 50 wt %. In terms of upper limits, the water concentration in the dehydration distillate stream can be less than 50 wt %, e.g., less than 38 wt %, less than 29 wt %, less than 21 wt %, less than 16 wt %, less than 12 wt %, less than 9.2 wt %, less than 7 wt %, less than 5.3 wt %, or less than 4 wt %. In terms of lower limits, the water concentration in the dehydration distillate stream can be greater than 3 wt %, e.g., greater than 4 wt %, greater than 5.3 wt %, greater than 7 wt %, greater than 9.2 wt %, greater than 12 wt %, greater than 16 wt %, greater than 21 wt %, greater than 28 wt %, or greater than 38 wt %. Higher water concentrations, e.g., greater than 50 wt %, and lower water concentrations, e.g., less than 3 wt %, are also considered.

In some embodiments, the concentration of water in the dehydration bottoms stream ranges from 70 wt % to 99 wt %, e.g., from 70 wt % to 96 wt %, from 79 wt % to 97 wt %, from 85 wt % to 98 wt %, from 89 wt % to 98.6 wt %, or from 92 wt % to 99 wt %. In terms of upper limits, the water concentration in the dehydration bottoms stream can be less than 99 wt %, e.g., less than 98.6 wt %, less than 98 wt %, less than 97 wt %, less than 96 wt %, less than 95 wt %, less than 92 wt %, less than 89 wt %, less than 85 wt %, or less than 79 wt %. In terms of lower limits, the water concentration in the dehydration bottoms stream can be greater than 70 wt %, e.g., greater than 79 wt %, greater than 85 wt %, greater than 89 wt %, greater than 92 wt %, greater than 95 wt %, greater than 96 wt %, greater than 97 wt %, greater than 98 wt %, or greater than 98.6 wt %. Higher water concentrations, e.g., greater than 99 wt %, and lower water concentrations, e.g., less than 70 wt %, are also contemplated.

In some embodiments, the mass ratio of the water in the dehydration bottoms stream to the water in the dehydration distillate stream ranges from 10:1 to 200:1, e.g., from 10:1 to 60:1, from 13:1 to 81:1, from 18:1 to 110:1, from 25:1 to 150:1, or from 33:1 to 200:1. In terms of upper limits, the mass ratio of water in the dehydration bottoms stream to the dehydration distillate stream can be less than 200:1, e.g., less than 150:1, less than 110:1, less than 81:1, less than 60:1, less than 45:1, less than 33:1, less than 25:1, less than 18:1, or less than 13:1. In terms of lower limits, the mass ratio of water in the dehydration bottoms stream to the dehydration distillate stream can be greater than 10:1, e.g., greater than 13:1, greater than 18:1, greater than 25:1, greater than 33:1, greater than 45:1, greater than 60:1, greater than 81:1, greater than 110:1, or greater than 150:1. Higher mass ratios, e.g., greater than 200:1, and lower mass ratios, e.g., less than 10:1, are also contemplated.

In some embodiments, the concentration of allyl alcohol in the dehydration distillate stream ranges from 0.15 wt % to 3.5 wt %, e.g., from 0.15 wt % to 1 wt %, from 0.21 wt % to 1.4 wt %, from 0.28 wt % to 1.9 wt %, from 0.39 wt % to 2.6 wt %, or from 0.53 wt % to 3.5 wt %. In terms of upper limits, the allyl alcohol concentration in the dehydration distillate stream can be less than 3.5 wt %, e.g., less than 2.6 wt %, less than 1.9 wt %, less than 1.4 wt %, less than 1 wt %, less than 0.72 wt %, less than 0.53 wt %, less than 0.39 wt %, less than 0.28 wt %, or less than 0.21 wt %. In terms of lower limits, the allyl alcohol concentration in the dehydration distillate stream can be greater than 0.15 wt %, e.g., greater than 0.21 wt %, greater than 0.28 wt %, greater than 0.39 wt %, greater than 0.53 wt %, greater than 0.72 wt %, greater than 1 wt %, greater than 1.4 wt %, greater than 1.9 wt %, or greater than 2.6 wt %. Higher allyl alcohol concentrations, e.g., greater than 3.5 wt %, and lower allyl alcohol concentrations, e.g., less than 0.15 wt %, are also contemplated.

In some embodiments, the concentration of allyl alcohol in the dehydration bottoms stream ranges from 0.03 wt % to 0.75 wt %, e.g., from 0.03 wt % to 0.21 wt %, from 0.041 wt % to 0.29 wt %, from 0.057 wt % to 0.4 wt %, from 0.079 wt % to 0.54 wt %, or from 0.11 wt % to 0.75 wt %. In terms of upper limits, the allyl alcohol concentration in the dehydration bottoms stream can be less than 0.75 wt %, e.g., less than 0.54 wt %, less than 0.39 wt %, less than 0.29 wt %, less than 0.21 wt %, less than 0.15 wt %, less than 0.11 wt %, less than 0.079 wt %, less than 0.057 wt %, or less than 0.041 wt %. In terms of lower limits, the allyl alcohol concentration in the dehydration bottoms stream can be greater than 0.03 wt %, e.g., greater than 0.041 wt %, greater than 0.057 wt %, greater than 0.079 wt %, greater than 0.11 wt %, greater than 0.15 wt %, greater than 0.21 wt %, greater than 0.29 wt %, greater than 0.4 wt %, or greater than 0.54 wt %. Higher allyl alcohol concentrations, e.g., greater than 0.75 wt %, and lower allyl alcohol concentrations, e.g., less than 0.03 wt %, are also contemplated.

In some embodiments, the concentration of acrylonitrile in the dehydration distillate stream ranges from 0.15 wt % to 5.5 wt %, e.g., from 0.15 wt % to 4.5 wt %, from 0.2 wt % to 4.0 wt %, from 0.5 wt % to 3.0 wt %, from 1.0 wt % to 2.5 wt %, or from 1.0 wt % to 2.0 wt %. In terms of upper limits, the acrylonitrile concentration in the dehydration distillate stream can be less than 5.5 wt %, e.g., less than 4.5 wt %, less than 4.0 wt %, less than 3.0 wt %, less than 2.5 wt %, less than 2.0 wt %, or less than 1.8 wt %. In terms of lower limits, the acrylonitrile concentration in the dehydration distillate stream can be greater than 0.15 wt %, e.g., greater than 0.2 wt %, greater than 0.5 wt %, greater than 1.0 wt %, or greater than 1.5 wt %. Higher acrylonitrile concentrations, e.g., greater than 5.5 wt %, and lower acrylonitrile concentrations, e.g., less than 0.15 wt %, are also contemplated.

In some embodiments, the concentration of oxazole in the dehydration bottoms stream ranges from 9 ppm to 220 ppm, e.g., from 9 ppm to 61 ppm, from 12 ppm to 84 ppm, from 17 ppm to 120 ppm, from 23 ppm to 160 ppm, or from 32 ppm to 220 ppm. In terms of upper limits the oxazole concentration in the dehydration bottoms stream can be less than 220 ppm, e.g., less than 160 ppm, less than 120 ppm, less than 84 ppm, less than 61 ppm, less than 44 ppm, less than 32 ppm, less than 23 ppm, less than 17 ppm, or less than 12 ppm. In terms of lower limits, the oxazole concentration in the dehydration bottoms stream can be greater than 9 ppm, e.g., greater than 12 ppm, greater than 17 ppm, greater than 23 ppm, greater than 32 ppm, greater than 44 ppm, greater than 61 ppm, greater than 84 ppm, greater than 120 ppm, or greater than 160 ppm. Higher oxazole concentrations, e.g., greater than 220 ppm, and lower oxazole concentrations, e.g., less than 9 ppm, are also contemplated.

In some embodiments, the concentration of oxazole in the dehydration distillate stream ranges from 0.7 wt % to 15 wt %, e.g., from 0.7 wt % to 4.4 wt %, from 1 wt % to 6 wt %, from 1.3 wt % to 8.1 wt %, from 1.8 wt % to 11 wt %, or from 2.4 wt % to 15 wt %. In terms of upper limits, the oxazole concentration in the dehydration distillate stream can be less than 15 wt %, e.g., less than 11 wt %, less than 8.1 wt %, less than 6 wt %, less than 4.4 wt %, less than 3.2 wt %, less than 2.4 wt %, less than 1.8 wt %, less than 1.3 wt %, or less than 1 wt %. In terms of lower limits, the oxazole concentration in the dehydration distillate stream can be greater than 0.7 wt %, e.g., greater than 1 wt %, greater than 1.3 wt %, greater than 1.8 wt %, greater than 2.4 wt %, greater than 3.2 wt %, greater than 4.4 wt %, greater than 6 wt %, greater than 8.1 wt %, or greater than 11 wt %. Higher oxazole concentrations, e.g., greater than 15 wt %, and lower oxazole concentrations, e.g., less than 0.7 wt %, are also contemplated.

In some embodiments, the concentration of acetonitrile in the dehydration distillate stream ranges from 25 wt % to 90 wt %, e.g., from 25 wt % to 78 wt %, from 39 wt % to 82 wt %, from 50 wt % to 85 wt %, from 59 wt % to 88 wt %, or from 67 wt % to 90 wt %. In terms of upper limits, the acetonitrile concentration in the dehydration distillate stream can be less than 90 wt %. e.g., less than 88 wt %, less than 85 wt %, less than 82 wt %, less than 78 wt %, less than 73 wt %, less than 67 wt %, less than 59 wt %, less than 50 wt %, or less than 39 wt %. In terms of lower limits, the acetonitrile concentration in the dehydration distillate stream can be greater than 25 wt %, e.g., greater than 39 wt %, greater than 50 wt %, greater than 59 wt %, greater than 67 wt %, greater than 73 wt %, greater than 78 wt %, greater than 82 wt %, greater than 85 wt %, or greater than 88 wt %. Higher acetonitrile concentrations, e.g., greater than 90 wt %, and lower acetonitrile concentrations, e.g., less than 25 wt %, are also contemplated.

In some embodiments, the concentration of acetonitrile in the dehydration bottoms stream ranges from 0.02 wt % to 0.45 wt %, e.g., from 0.02 wt % to 0.13 wt %, from 0.027 wt % to 0.18 wt %, from 0.037 wt % to 0.24 wt %, from 0.051 wt % to 0.33 wt %, or from 0.069 wt % to 0.45 wt %. In terms of upper limits, the acetonitrile concentration in the dehydration bottoms stream can be less than 0.45 wt %, e.g., less than 0.33 wt %, less than 0.24 wt %, less than 0.18 wt %, less than 0.13 wt %, less than 0.095 wt %, less than 0.069 wt %, less than 0.051 wt %, less than 0.037 wt %, or less than 0.027 wt %. In terms of lower limits, the acetonitrile concentration in the dehydration bottoms stream can be greater than 0.02 wt %, e.g., greater than 0.027 wt %, greater than 0.037 wt %, greater than 0.051 wt %, greater than 0.069 wt %, greater than 0.095 wt %, greater than 0.13 wt %, greater than 0.18 wt %, greater than 0.24 wt %, or greater than 0.33 wt %. Higher acetonitrile concentrations, e.g., greater than 0.45 wt %, and lower acetonitrile concentrations, e.g., less than 0.02 wt %, are also contemplated.

The dehydration distillation column may be operate under a vacuum or a high pressure. When operating under a vacuum, the pressure in the dehydration distillation is controlled to be less than 0 kPa (gauge), e.g., less than-5 kPa, less than-10 kPa, less than-20 kPa, less than-25 kPa, less than-30 kPa, less than-40 kPa, less than-50 kPa, or less than-60 kPa. In terms of ranges, the pressure may range from −100 kPa to 0 kPa, e.g., from −90 kPa to −10 kPa, from −80 kPa to −20 kPa, or −75 kPa to −30 kPa. In some embodiments, the dehydration distillation column is operated at a high pressure ranging from 0.5 kPa to 50 kPa (gauge), e.g., from 1 kPa to 40 kPa, from 2 kPa to 30 kPa, from 5 kPa to 25 kPa, or from 10 kPa to 20 kPa. In terms of upper limits, the dehydration distillation column operating pressure can be less than 50 kPa, e.g., less than 45 kPa, less than 40 kPa less than 35 kPa, less than 30 kPa, less than 25 kPa, less than 20 kPa, or less than 17 kPa. In terms of lower limits, the dehydration distillation column operating pressure can be greater than 0.5 kPa, e.g., greater than 1 kPa, greater than 2 kPa, greater than 3 kPa, greater than 5 kPa, greater than 8 kPa, greater than 10 kPa, greater than 12 kPa, or greater than 14 kPa. Higher column pressures, e.g., greater than 50 kPa, and lower column pressures, e.g., less than 1 kPa, are also contemplated. Operation at these pressures, in some cases, provides for the aforementioned benefits.

In some embodiments, the dehydration distillation column is operated at a bottom temperature ranging from 25° C. to 120° C., e.g., from 30° C. to 115° C., from 30° C. to 110° C., from 40° C. to 100° C., from 50° C. to 100° C., or from 60° C. to 85° C. Operation at these temperatures, in some cases, provides for the aforementioned benefits.

In some embodiments, the dehydration distillation column may be operated with reflux to enhance separation. The reflux is a portion of the vapors from the top of the column that is condensed and return to the upper portion of the dehydration distillation column above the feed point. The reflux ratio, being the ratio between the amount of condensed liquid returned to the distillation column and the amount of condensed liquid that is collected, may be from 100:1 to 1:100, e.g., from 75:1 to 1:75, from 50:1 to 1:50, from 30:1 to 1:30, from 25:1 to 1:25, from 20:1 to 1:20, from 15:1 to 1:15, from 10:1 to 1:10, from 5:1 to 1:5 or from 4:1 to 1:4. In some embodiments, the reflux ratio may be from 5:1 to 1:50, e.g., from 5:1 to 1:25, from 3:1 to 1:20, or from 2:1 to 1:5.

Extraction

In some embodiments, the dehydrating of the feedstock stream includes an extraction operation. In some embodiments, the extraction operation is in place of a distillation in the dehydration steps of the overall provided separation process. In some embodiments, the extraction operation is in addition to the distillation in the dehydration steps of the overall process. In some embodiments, the dehydration distillate stream of the provided separation process is extracted to further remove water originally present in the feedstock stream, producing a raffinate stream (top) that does not include the water removed in the extraction. An extract stream (bottom) yielded by the extraction thus includes at least a portion of the water from the dehydration distillate stream. The raffinate stream includes at least a portion of the acetonitrile from the dehydration distillate stream.

The extractor is configured and operated such that the concentration of water in the raffinate stream is less than that in the dehydration distillate stream. It can be beneficial for the provided separation process to remove much of the water still remaining in the dehydration distillate stream to realize energy and cost efficiencies, and to provide a final product acetonitrile stream having a higher acetonitrile product purity. In particular, the removal of water prior to the reaction step of the overall separation process can minimize or prevent the reversibility of this reaction, improving its effectiveness in removing allyl alcohol present in the dehydrated stream.

In some embodiments, the concentration of water in the raffinate stream ranges from 0.01 wt % to 1 wt %, e.g., from 0.01 wt % to 0.16 wt %, from 0.016 wt % to 0.25 wt %, from 0.025 wt % to 0.4 wt %, from 0.04 wt % to 0.63 wt %, or from 0.063 wt % to 1 wt %. In terms of upper limits, the water concentration in the raffinate stream can be less than 1 wt %, e.g., less than 0.63 wt %, less than 0.4 wt %, less than 0.25 wt %, less than 0.16 wt %, less than 0.1 wt %, less than 0.063 wt %, less than 0.04 wt %, less than 0.025 wt %, or less than 0.016 wt %. In terms of lower concentrations, the water concentration in the raffinate stream can be greater than 0.01 wt %, e.g., greater than 0.016 wt %, greater than 0.025 wt %, greater than 0.04 wt %, greater than 0.063 wt %, greater than 0.1 wt %, greater than 0.16 wt %, greater than 0.25 wt %, greater than 0.4 wt %, or greater than 0.63 wt %. Higher water concentrations, e.g., greater than 1 wt %, and lower water concentrations, e.g., less than 0.01 wt %, are also contemplated.

In some embodiments, the concentration of water in the extract stream ranges from 30 wt % to 90 wt %, e.g., from 30 wt % to 78 wt %, from 42 wt % to 82 wt %, from 53 wt % to 85 wt %, from 61 wt % to 88 wt %, or from 68 wt % to 90 wt %. In terms of upper limits, the water concentration in the extract stream can be less than 90 wt %, e.g., less than 88 wt %, less than 85 wt %, less than 82 wt %, less than 78 wt %, less than 74 wt %, less than 68 wt %, less than 61 wt %, less than 53 wt %, less than 42 wt %. In terms of lower limits, the water concentration in the extract stream can be greater than 30 wt %, e.g., greater than 42 wt %, greater than 53 wt %, greater than 61 wt %, greater than 68 wt %, greater than 74 wt %, greater than 78 wt %, greater than 82 wt %, greater than 85 wt %, or greater than 88 wt %. Higher water concentrations, e.g., greater than 90 wt %, and lower water concentrations, e.g., less than 30 wt %, are also contemplated.

In some cases caustic is present in the extract as well.

In some embodiments, the mass ratio of the water in the extract stream to the water in the raffinate stream ranges from 40:1 to 900:1, e.g., from 40:1 to 260:1, from 55:1 to 350:1, from 75:1 to 480:1, from 100:1 to 660:1, or from 140:1 to 900:1. In terms of upper limits, the mass ratio of water in the extract stream to the raffinate stream can be less than 900:1, e.g., less than 660:1, less than 480:1, less than 350:1, less than 260:1, less than 190:1, less than 140:1, less than 100:1, less than 75:1, or less than 55:1. In terms of lower limits, the mass ratio of water in the extract stream to the raffinate stream can be greater than 40:1, e.g., greater than 55:1, greater than 75:1, greater than 100:1, greater than 140:1, greater than 190:1, greater than 260:1, greater than 350:1, greater than 480:1, or greater than 660:1. Higher mass ratios, e.g., greater than 900:1, and lower mass ratios, e.g., less than 40:1, are also contemplated.

In some embodiments, the concentration of allyl alcohol in the raffinate stream ranges from 0.08 wt % to 8 wt %, e.g., from 0.08 wt % to 1.3 wt %, from 0.13 wt % to 1 wt %, from 0.2 wt % to 3.2 wt %, from 0.32 wt % to 5 wt %, or from 0.5 wt % to 8 wt %. In terms of upper limits, the allyl alcohol concentration in the raffinate stream can be less than 8 wt %, e.g., less than 5 wt %, less than 3.2 wt %, less than 2 wt %, less than 1.3 wt %, less than 0.8 wt %, less than 0.5 wt %, less than 0.3 wt %, less than 0.2 wt %, or less than 0.13 wt %. In terms of lower limits, the allyl alcohol concentration in the raffinate stream can be greater than 0.08 wt %, e.g., greater than 0.13 wt %, greater than 0.2 wt %, greater than 0.3 wt %, greater than 0.5 wt %, greater than 0.8 wt %, greater than 1.3 wt %, greater than 2 wt %, greater than 3.2 wt %, or greater than 5 wt %. Higher allyl alcohol concentrations, e.g., greater than 8 wt %, and lower allyl alcohol concentrations, e.g., less than 0.08 wt %, are also contemplated.

In some embodiments, the concentration of oxazole in the raffinate stream ranges from 0.85 wt % to 18 wt %, e.g., from 0.85 wt % to 5.3 wt %, from 1.2 wt % to 7.2 wt %, from 1.6 wt % to 9.8 wt %, from 2.1 wt % to 13 wt %, or from 2.9 wt % to 18 wt %. In terms of upper limits, the oxazole concentration in the raffinate stream can be less than 18 wt %, e.g., less than 13 wt %, less than 9.8 wt %, less than 7.2 wt %, less than 5.3 wt %, less than 3.9 wt %, less than 2.9 wt %, less than 2.1 wt %, less than 1.6 wt %, or less than 1.2 wt %. In terms of lower limits, the oxazole concentration in the raffinate stream can be greater than 0.85 wt %, e.g., greater than 1.2 wt %, greater than 1.6 wt %, greater than 2.1 wt %, greater than 2.9 wt %, greater than 3.9 wt %, greater than 5.3 wt %, greater than 7.2 wt %, greater than 9.8 wt % or greater than 13 wt %. Higher oxazole concentrations, e.g., greater than 18 wt %, and lower oxazole concentrations, e.g., less than 0.85 wt %, are also contemplated.

In some embodiments, the concentration of acetonitrile in the raffinate stream ranges from 40 wt % to 90 wt %, e.g., from 40 wt % to 80 wt %, from 50 wt % to 83 wt %, from 58 wt % to 86 wt %, from 65 wt % to 88 wt %, or from 71 wt % to 90 wt %. In terms of upper limits, the acetonitrile concentration in the raffinate stream can be less than 90 wt %, e.g., less than 88 wt %, less than 86 wt %, less than 83 wt %, less than 80 wt %, less than 76 wt %, less than 71 wt %, less than 65 wt %, less than 58 wt %, or less than 50 wt %. In terms of lower limits, the acetonitrile concentration in the raffinate stream can be greater than 40 wt %, e.g., greater than 50 wt %, greater than 58 wt %, greater than 65 wt %, greater than 71 wt %, greater than 76 wt %, greater than 80 wt %, greater than 83 wt %, greater than 86 wt %, or greater than 88 wt %. Higher acetonitrile concentrations, e.g., greater than 90 wt %, and lower acetonitrile concentrations, e.g., less than 40 wt %, are also contemplated.

In some embodiments, the mass ratio of the acetonitrile to the water in the raffinate stream ranges from 60:1 to 5000:1, e.g., from 60:1 to 850:1, from 93:1 to 1300:1, from 150:1 to 2100:1, from 230:1 to 3200:1, or from 350:1 to 5000:1. In terms of upper limits, the mass ratio of acetonitrile to water in the raffinate stream can be less than 5000:1, e.g., less than 3200:1, less than 2100:1, less than 1300:1, less than 850:1, less than 550:1, less than 350:1, less than 230:1, less than 150:1, or less than 93:1. In terms of lower limits, the mass ratio of acetonitrile to water in the raffinate stream can be greater than 60:1, e.g., greater than 93:1, greater than 150:1, greater than 230:1 greater than 350:1, greater than 550:1, greater than 850:1, greater than 1300:1, greater than 2100:1, or greater than 3200:1. Higher mass ratios, e.g., greater than 5000:1, and lower mass ratios, e.g., less than 60:1, are also contemplated.

In some embodiments, the raffinate stream includes at least a portion of the oxazole from the feedstock stream. The concentration of oxazole in the raffinate stream can range, for example, from 0.4 wt % to 30 wt %, e.g., from 0.4 wt % to 5.3 wt %, from 0.62 wt % to 8.2 wt %, from 0.95 wt % to 13 wt %, from 1.5 wt % to 19 wt %, or from 2.2 wt % to 30 wt %. In terms of upper limits, the oxazole concentration in the raffinate stream can be less than 30 wt %, e.g., less than 19 wt %, less than 13 wt %, less than 8.2 wt %, less than 5.3 wt %, less than 3.5 wt %, less than 2.2 wt %, less than 1.5 wt %, less than 0.95 wt %, or less than 0.62 wt %. In terms of lower limits, the oxazole concentration in the raffinate stream can be greater than 0.4 wt %, e.g., greater than 0.62 wt %, greater than 0.95 wt %, greater than 1.5 wt %, greater than 2.2 wt %, greater than 3.5 wt %, greater than 5.3 wt %, greater than 8.2 wt %, greater than 13 wt %, or greater than 19 wt %. Higher oxazole concentrations, e.g., greater than 30 wt %, and lower oxazole concentrations, e.g., less than 0.4 wt %, are also contemplated.

In some embodiments, the extraction is configured and operated to also remove acrylonitrile originally present in the feedstock stream, producing a raffinate stream that does not include the acrylonitrile removed in the extraction.

The extract stream yielded by the extraction thus includes at least a portion of the acrylonitrile from the dehydration distillate stream. In some embodiments, the concentration of acrylonitrile in the extract stream ranges from 1 wt % to 20 wt %, e.g., from 1 wt % to 6 wt %, from 1.3 wt % to 8.1 wt %, from 1.8 wt % to 11 wt %, from 2.5 wt % to 15 wt %, or from 3.3 wt % to 20 wt %. In terms of upper limits, the acrylonitrile concentration in the extract stream can be less than 20 wt %, e.g., less than 15 wt %, less than 11 wt %, less than 8.1 wt %, less than 6 wt %, less than 4.5 wt %, less than 3.3 wt %, less than 2.5 wt %, less than 1.8 wt %, or less than 1.3 wt %. In terms of lower limits, the acrylonitrile concentration in the extract stream can be greater than 1 wt %, e.g., greater than 1.3 wt %, greater than 1.8 wt %, greater than 2.5 wt %, greater than 3.3 wt %, greater than 4.5 wt %, greater than 6 wt %, greater than 8.1 wt %, greater than 11 wt %, or greater than 15 wt %. Higher acrylonitrile concentrations, e.g., greater than 20 wt %, and lower acrylonitrile concentrations, e.g., less than 1 wt %, are also contemplated.

In addition, in some cases, the extraction may be conducted using an extraction solvent that comprises a caustic solution. For example, the extraction solvent may comprise a basic solvent, e.g., sodium hydroxide and/or potassium hydroxide. This listing is not exhaustive and other caustics are contemplated.

As a result of this caustic treatment, at least some of the acrylonitrile in the dehydration distillate is reacted, e.g., hydrolyzed, to form hydroxypropionitrile, which surprisingly and significantly improves acrylonitrile separation/purity operations downstream. As a result, hydroxypropionitrile may be present in the extract stream in an amount ranging from 0.01 wt % to 5.0 wt %, e.g., from 0.05 wt % to 3.0 wt %, from 0.05 wt % to 2.0 wt %, from 0.07 wt % to 2.0 wt %, from 0.07 wt % to 1.5 wt %, from 0.1 wt % to 1 wt %, or from 0.1 wt % to 0.7 wt %. In terms of upper limits, the acrylonitrile concentration in the extract stream can be less than 5.0 wt %, e.g., less than 3.0 wt %, less than 2.0 wt %, less than 1.5 wt %, less than 1.0 wt %, or less than 0.7 wt %. In terms of lower limits, the acrylonitrile concentration in the extract stream can be greater than 0.01 wt %, e.g., greater than 0.05 wt %, greater than 0.07 wt %, greater than 0.1 wt %, or greater than 0.15 wt %. Higher acrylonitrile concentrations, e.g., greater than 5.0 wt %, and lower acrylonitrile concentrations, e.g., less than 0.01 wt %, are also contemplated.

Beneficially, the disclosed processes achieve the hydrolysis of the acrylonitrile as well as the extraction of the other aforementioned impurities in a single extraction step. Thus, the disclosed process advantageously reduces the number of units necessary to achieve suitable separations, which contributes to a significant reduction in, inter alia, capital expenditure.

Reaction

The provided separation process includes a reaction step configured to remove allyl alcohol and/or oxazole present in the dehydrated stream. The dehydrated stream is introduced to a reactor, which is operated under conditions suitable for converting allyl alcohol and/or oxazole in the dehydrated stream via reaction with (strong) acid, and yielding a reactor output stream having a lower allyl alcohol and/or oxazole concentration that that of the dehydrated stream. It can be beneficial for the provided separation process to remove much of the allyl alcohol and/or oxazole and/or acrylonitrile of the dehydrated stream in the reaction, rather than in later unit operations, to realize energy and cost efficiencies, and to provide a final product acetonitrile stream having a higher acetonitrile product purity. In some embodiments, the reaction step is downstream of, e.g., immediately downstream of, the extraction step, such that the raffinate stream is the dehydrated stream. In such configurations, component concentrations of the dehydrated stream are as described above for the raffinate stream.

In the reactor, the dehydrated stream is treated with strong acid to react out the various impurities.

In some cases, the reaction of the allyl alcohol yields various protonated salt species. In some embodiments, the concentration of protonated salt species in the reactor output stream ranges from 0.08 wt % to 8 wt %, e.g., from 0.08 wt % to 1.3 wt %, from 0.13 wt % to 1 wt %, from 0.2 wt % to 3.2 wt %, from 0.32 wt % to 5 wt %, or from 0.5 wt % to 8 wt %. In terms of upper limits, the protonated salt species concentration in the reactor output stream can be less than 8 wt %, e.g., less than 5 wt %, less than 3.2 wt %, less than 2 wt %, less than 1.3 wt %, less than 0.8 wt %, less than 0.5 wt %, less than 0.3 wt %, less than 0.2 wt %, or less than 0.13 wt %. In terms of lower limits, the protonated salt species concentration in the reactor output stream can be greater than 0.08 wt %, e.g., greater than 0.1 wt %, greater than 0.13 wt %, greater than 0.2 wt %, greater than 0.3 wt %, greater than 0.5 wt %, greater than 0.8 wt %, greater than 1.3 wt %, greater than 2 wt %, greater than 3.2 wt %, or greater than 5 wt %. Higher protonated salt species concentrations, e.g., greater than 8 wt %, and lower protonated salt species concentrations, e.g., less than 0.08 wt %, are also contemplated.

In some cases, the reaction of the oxazole yields oxazole sulfate. In some embodiments, the concentration of oxazole sulfate in the reactor output stream ranges from 0.1 wt % to 20 wt %, e.g., from 0.85 wt % to 18 wt %, from 0.85 wt % to 5.3 wt %, from 1.2 wt % to 7.2 wt %, from 1.6 wt % to 9.8 wt %, from 2.1 wt % to 13 wt %, or from 2.9 wt % to 18 wt %. In terms of upper limits, the oxazole sulfate concentration in the reactor output stream can be less than 18 wt %, e.g., less than 13 wt %, less than 9.8 wt %, less than 7.2 wt %, less than 5.3 wt %, less than 3.9 wt %, less than 2.9 wt %, less than 2.1 wt %, less than 1.6 wt %, or less than 1.2 wt %. In terms of lower limits, the oxazole sulfate concentration in the reactor output stream can be greater than 0.1 wt %, e.g., greater than 0.85 wt %, greater than 1.2 wt %, greater than 1.6 wt %, greater than 2.1 wt %, greater than 2.9 wt %, greater than 3.9 wt %, greater than 5.3 wt %, greater than 7.2 wt %, greater than 9.8 wt % or greater than 13 wt %. Higher oxazole sulfate concentrations, e.g., greater than 18 wt %, and lower oxazole sulfate concentrations, e.g., less than 0.85 wt %, are also contemplated.

As used herein, the term "strong acid" refers to an acid compound or composition having a pKa value less than −2. Examples of strong acids suitable for use with the reactor of the provided separation process include hydrochloric acid, sulfuric acid, hydrobromic acid, hydroiodic acid, perchloric acid, and chloric acid. In some embodiments, the strong acid is sulfuric acid.

In some embodiments, the concentration of allyl alcohol in the reactor output stream ranges from 0.07 ppm to 7 ppm, e.g., from 0.07 ppm to 1.1 ppm, from 0.11 ppm to 1.8 ppm, from 0.18 ppm to 2.8 ppm, from 0.28 ppm to 4.4 ppm, or from 0.44 ppm to 7 ppm. In terms of upper limits, the allyl alcohol concentration in the reactor output stream can be less than 7 ppm, e.g., less than 4.4 ppm, less than 2.8 ppm, less than 1.8 ppm, less than 1.1 ppm, less than 0.7 ppm, less than 0.44 ppm, less than 0.28 ppm, less than 0.18 ppm, or less than 0.11 ppm. In terms of lower limits, the allyl alcohol concentration in the reactor output stream can be greater than 0.07 ppm, e.g., greater than 0.11 ppm, greater than 0.18 ppm, greater than 0.28 ppm, greater than 0.44 ppm, greater than 0.7 ppm, greater than 1.1 ppm, greater than 1.8 ppm, greater than 2.8 ppm, or greater than 4.4 ppm. Higher allyl alcohol concentrations, e.g., greater than 7 ppm, and lower allyl alcohol concentrations, e.g., less than 0.07 ppm, are also contemplated.

In some embodiments, the mass ratio of the allyl alcohol in the dehydrated stream to the allyl alcohol in the reactor output stream ranges from 2500:1 to 45,000:1, e.g., from 2500:1 to 14,000:1, from 3300:1 to 19,000:1, from 4500:1 to 25,000:1, from 6000:1 to 34,000:1, or from 7900:1 to 45,000:1. In terms of upper limits, the mass ratio of allyl alcohol in the dehydrated stream to the reactor output stream can be less than 45,000:1, e.g., less than 34,000:1, less than 25,000:1, less than 19,000:1, less than 14,000:1, less than 11,000:1, less than 7900:1, less than 6000:1, less than 4500:1, or less than 3400:1. In terms of lower limits, the mass ratio of allyl alcohol in the dehydrated stream to the reactor output stream can be greater than 2500:1, e.g., greater than 3400:1, greater than 4500:1, greater than 6000:1, greater than 7900:1, greater than 11,000:1, greater than 14,000:1, greater than 19,000:1, greater than 25,000:1, or greater than 34,000:1. Higher mass ratios, e.g., greater than 45,000:1, and lower mass ratios, e.g., less than 2500:1, are also contemplated.

In some embodiments, the concentration of acetonitrile in the reactor output stream ranges from 30 wt % to 90 wt %, e.g., from 30 wt % to 78 wt %, from 42 wt % to 82 wt %, from 53 wt % to 85 wt %, from 61 wt % to 88 wt %, or from 68 wt % to 90 wt %. In terms of upper limits, the acetonitrile concentration in the reactor output stream can be less than 90 wt %, e.g., less than 88 wt %, less than 85 wt %, less than 82 wt %, less than 78 wt %, less than 74 wt %, less than 68 wt %, less than 61 wt %, less than 53 wt %, less than 42 wt %. In terms of lower limits, the acetonitrile concentration in the reactor output stream can be greater than 30 wt %, e.g., greater than 42 wt %, greater than 53 wt %, greater than 61 wt %, greater than 68 wt %, greater than 74 wt %, greater than 78 wt %, greater than 82 wt %, greater than 85 wt %, or greater than 88 wt %. Higher acetonitrile concentrations, e.g., greater than 90 wt %, and lower acetonitrile concentrations, e.g., less than 30 wt %, are also contemplated.

In some embodiments, the mass ratio of the acetonitrile to the allyl alcohol in the reactor output stream ranges from 100,000:1 to 10,000,000:1, e.g., from 100,000:1 to 1,600,000:1, from 160,000:1 to 2,500,000:1, from 250,000:1 to 4,000,000:1, from 400,000:1 to 6,300,000:1, or from 630,000:1 to 10,000,000:1. In terms of upper limits, the mass ratio of acetonitrile to allyl alcohol in the reactor output stream can be less than 10,000,000:1, e.g., less than 6,300,000:1, less than 4,000,000:1, less than 2,500,000:1, less than 1,600,000:1, less than 1,000,000:1, less than 630,000:1, less than 400,000:1, less than 250,000:1, or less than 160,000:1. In terms of lower limits, the mass ratio of acetonitrile to allyl alcohol in the reactor output stream can be greater than 100,000:1, e.g., greater than 160,000:1, greater than 250,000:1, greater than 400,000:1, greater than 630,000:1, greater than 1,000,000:1, greater than 1,600,000:1, greater than 2,500,000:1, greater than 4,000,000:1, or greater than 6,300,000:1. Higher mass ratios, e.g., greater than 10,000,000:1, and lower mass ratios, e.g., less than 100,000:1, are also contemplated.

In some embodiments, reaction is operated under conditions that are also suitable for converting oxazole in the dehydrated stream, and yielding a reactor output stream having a lower oxazole concentration that that of the dehydrated stream. The oxazole concentration in the reactor output stream can range, for example, from 0.8 ppm to 20 ppm, e.g., from 0.8 ppm to 5.5 ppm, from 1.1 ppm to 7.6 ppm, from 1.5 ppm to 11 ppm, from 2.1 ppm to 14 ppm, or from 2.9 ppm to 20 ppm. In terms of upper limits, the oxazole concentration in the reactor output stream can be less than 20 ppm, e.g., less than 14 ppm, less than 11 ppm, less than 7.6 ppm, less than 5.5 ppm, less than 4 ppm, less than 2.9 ppm, less than 2.1 ppm, less than 1.5 ppm, or less than 1.1 ppm. In terms of lower limits, the oxazole concentration in the reactor output stream can be greater than 0.8 ppm, e.g., greater than 1.1 ppm, greater than 1.5 ppm, greater than 2.1 ppm, greater than 2.9 ppm, greater than 4 ppm, greater than 5.5 ppm, greater than 7.6 ppm, greater than 11 ppm, or greater than 14 ppm. Higher oxazole concentrations, e.g., greater than 20 ppm, and lower oxazole concentrations, e.g., less than 0.8 ppm, are also contemplated.

In some embodiments, the mass ratio of the oxazole in the dehydrated stream to the oxazole in the reactor output stream ranges from ranges from 2500:1 to 45,000:1, e.g., from 2500:1 to 14,000:1, from 3300:1 to 19,000:1, from 4500:1 to 25,000:1, from 6000:1 to 34,000:1, or from 7900:1 to 45,000:1. In terms of upper limits, the mass ratio of oxazole in the dehydrated stream to the reactor output stream can be less than 45,000:1, e.g., less than 34,000:1, less than 25,000:1, less than 19,000:1, less than 14,000:1, less than 11,000:1, less than 7900:1, less than 6000:1, less than 4500:1, or less than 3400:1. In terms of lower limits, the mass ratio of oxazole in the dehydrated stream to the reactor output stream can be greater than 2500:1, e.g., greater than 3400:1, greater than 4500:1, greater than 6000:1, greater than 7900:1, greater than 11,000:1, greater than 14,000:1, greater than 19,000:1, greater than 25,000:1, or greater than 34,000:1. Higher mass ratios, e.g., greater than 45,000:1, and lower mass ratios, e.g., less than 2500:1, are also contemplated.

Purification (Lights Removal and/or Heavies Removal)

The provided separation process further includes one or more purification unit operations, i.e. distillation columns, to remove impurities not degraded in the reactor. In some embodiments, the separation process further includes a lights removal distillation. The lights removal distillation can be a further element of the dehydration of the feedstock stream, and can be located upstream of the reaction unit operation. In these cases, the lights removal distillation column can be fed the raffinate stream exiting the extraction unit operation, and can yield a lights removal distillation stream and a lights removal bottoms stream, the latter of which is the reactor input stream, e.g., the dehydrated stream. In such configurations, component concentrations of the reactor input stream are as described below for the lights removal bottom stream. Alternatively, the lights removal distillation can be an element of the purification of the reactor output stream, and can be located downstream of the reaction unit operation. In these cases, the lights removal distillation column can be fed the reactor output stream exiting the reaction, yielding a lights removal distillation stream and a light removal bottoms stream.

The light removal distillation column is configured and operated such that the concentration of light components such as methanol and/or acetone in the lights removal bottoms stream is less than in the stream fed to the column, e.g., the raffinate stream or the reactor output stream. The lights removal distillate stream thus includes at least a portion of the methanol and/or acetone fed to the lights removal distillation column. It can be beneficial for the provided separation process to remove much of the methanol and acetone in the lights removal distillation, rather than in later unit operations, to realize energy and cost efficiencies, and to provide a final product acetonitrile stream having a higher acetonitrile product purity.

In some embodiments, the concentration of methanol in the lights removal distillate stream ranges from 15 wt % to 95 wt %, e.g., from 15 wt % to 63 wt %, from 23 wt % to 71 wt %, from 31 wt % to 79 wt %, from 39 wt % to 87 wt %, or from 47 wt % to 95 wt %. In terms of upper limits, the methanol concentration in the lights removal distillate stream can be less than 95 wt %, e.g., less than 87 wt %, less than 79 wt %, less than 71 wt %, less than 63 wt %, less than 55 wt %, less than 47 wt %, less than 39 wt %, less than 31 wt %, or less than 23 wt %. In terms of lower limits, the methanol concentration in the lights removal distillate stream can be greater than 15 wt %, e.g., greater than 23 wt %, greater than 31 wt %, greater than 39 wt %, greater than 47 wt %, greater than 55 wt %, greater than 63 wt %, greater than 71 wt %, greater than 79 wt %, or greater than 87 wt %. Higher methanol concentrations, e.g., greater than 95 wt %, and lower methanol concentrations, e.g., less than 15 wt %, are also contemplated.

In some embodiments, the concentration of acetone in the lights removal distillate stream ranges from 0.35 wt % to 8.5 wt %, e.g., from 0.35 wt % to 2.4 wt %, from 0.48 wt % to 3.3 wt %, from 0.66 wt % to 4.5 wt %, from 0.91 wt % to 6.2 wt %, or from 1.3 wt % to 8.5 wt %. In terms of upper limits, the acetone concentration in the lights removal distillate can be less than 8.5 wt %, e.g., less than 6.2 wt %, less than 4.5 wt %, less than 3.3 wt %, less than 2.4 wt %, less than 1.7 wt %, less than 1.3 wt %, less than 0.91 wt %, less than 0.66 wt %, or less than 0.48 wt %. In terms of lower limits, the acetone concentration in the lights removal distillate stream can be greater than 0.35 wt %, e.g., greater than 0.48 wt %, greater than 0.66 wt %, greater than 0.91 wt %, greater than 1.3 wt %, greater than 1.7 wt %, greater than 2.4 wt %, greater than 3.3 wt %, greater than 4.5 wt %, or greater than 6.2 wt %. Higher acetone concentrations, e.g., greater than 8.5 wt %, and lower acetone concentrations, e.g., less than 0.35 wt %, are also contemplated.

In some embodiments, the concentration of acetonitrile in the lights removal distillate stream ranges from 10 wt % to 85 wt %, e.g., from 10 wt % to 49 wt %, from 17 wt % to 56 wt %, from 23 wt % to 62 wt %, from 30 wt % to 69 wt %, or from 36 wt % to 75 wt %. In terms of upper limits, the acetonitrile concentration in the lights removal distillate stream can be less than 75 wt %, e.g., less than 69 wt %, less than 62 wt %, less than 56 wt %, less than 49 wt %, less than 43 wt %, less than 36 wt %, less than 30 wt %, less than 23 wt %, or less than 17 wt %. In terms of lower limits, the acetonitrile concentration in the lights removal distillate stream can be greater than 10 wt %, e.g., greater than 17 wt %, greater than 23 wt %, greater than 30 wt %, greater than 36 wt %, greater than 43 wt %, greater than 49 wt %, greater than 56 wt %, greater than 62 wt %, or greater than 69 wt %. Higher acetonitrile concentrations, e.g., greater than 75 wt %, and lower acetonitrile concentrations, e.g., less than 10 wt %, are also contemplated.

In some embodiments, the concentration of allyl alcohol in the lights removal bottoms stream ranges from 0.16 ppm to 4 ppm, e.g., from 0.16 ppm to 1.1 ppm, from 0.22 ppm to 1.5 ppm, from 0.3 ppm to 2.1 ppm, from 0.42 ppm to 2.9 ppm, or from 0.58 ppm to 4 ppm. In terms of upper limits, the allyl alcohol concentration in the lights removal bottoms stream can be less than 4 ppm, e.g., less than 2.9 ppm, less than 2.1 ppm, less than 1.5 ppm, less than 1.1 ppm, less than 0.8 ppm, less than 0.57 ppm, less than 0.42 ppm, less than 0.3 ppm, or less than 0.22 ppm. In terms of lower limits, the allyl alcohol concentration in the lights removal bottoms stream can be greater than 0.16 ppm, e.g., greater than 0.22 ppm, greater than 0.3 ppm, greater than 0.42 ppm, greater than 0.58 ppm, greater than 0.8 ppm, greater than 1.1 ppm, greater than 1.5 ppm, greater than 2.1 ppm, or greater than 2.9 ppm. Higher allyl alcohol concentrations, e.g., greater than 4 ppm, and lower allyl alcohol concentrations, e.g., less than 0.16 ppm, are also contemplated.

In some embodiments, the concentration of oxazole in the lights removal bottoms stream ranges from 0.055 ppm to 1.3 ppm, e.g., from 0.055 ppm to 0.37 ppm, from 0.075 ppm to 0.5 ppm, from 0.1 ppm to 0.69 ppm, from 0.14 ppm to 0.95 ppm, or from 0.19 ppm to 1.3 ppm. In terms of upper limits, the oxazole concentration in the lights removal bottoms stream can be less than 1.3 ppm, e.g., less than 0.95 ppm, less than 0.69 ppm, less than 0.5 ppm, less than 0.37 ppm, less than 0.27 ppm, less than 0.19 ppm, less than 0.14 ppm, less than 0.1 ppm, or less than 0.075 ppm. In terms of lower limits, the oxazole concentration in the lights removal bottoms stream can be greater than 0.055 ppm, e.g., greater than 0.075 ppm, greater than 0.1 ppm, greater than 0.14 ppm, greater than 0.19 ppm, greater than 0.27 ppm, greater than 0.37 ppm, greater than 0.5 ppm, greater than 0.69 ppm, or greater than 0.95 ppm. Higher oxazole concentrations, e.g., greater than 1.3 ppm, and lower oxazole concentrations, e.g., less than 0.055 ppm, are also contemplated.

In some embodiments, the lights removal distillation column is operated at a pressure ranging from 10 kPa (gauge) to 150 kPa, e.g., from 15 kPa to 140 kPa, from 20 kPa to 120 kPa, from 30 kPa to 100 kPa, or from 35 kPa to 95 kPa. In terms of upper limits, the lights removal distillation column operating pressure can be less than 150 kPa, e.g., less than 140 kPa, less than 120 kPa, less than 100 kPa, or less than 95 kPa. In terms of lower limits, the lights removal distillation column operating pressure can be greater than 10 kPa, e.g., greater than 15 kPa, greater than 20 kPa, greater than 30 kPa, or greater than 35 kPa. Operation at these pressures, in some cases, provides for the aforementioned benefits.

In some embodiments, the lights removal distillation column is operated at a bottom temperature ranging from 40° C. to 130° C., e.g., from 50° C. to 125° C., from 60° C. to 115° C., from 70° C. to 105° C., from 80° C. to 100° C., or from 85° C. to 95° C. Operation at these temperatures, in some cases, provides for the aforementioned benefits.

In some embodiments, the lights removal distillation column may be operated with reflux to enhance separation. The reflux is a portion of the vapors from the top of the column that is condensed and return to the upper portion of the lights removal distillation column above the feed point. The reflux ratio may be from 100:1 to 1:100, e.g., from 75:1 to 1:75, from 50:1 to 1:50, from 40:1 to 1:40, from 35:1 to 1:35, from 30:1 to 1:30, from 25:1 to 1:25, from 20:1 to 1:20, or from 10:1 to 1:10. In some embodiments, the reflux ratio may be from 50:1 to 1:1, e.g., from 30:1 to 1:1, from 25:1 to 1:1, or from 20:1 to 1:1.

The structure of the lights removal distillation column can vary widely according to designs known to those of ordinary skill in the art, and any suitable column can be employed as long as the separation specifications described herein are achieved. For example the lights removal distillation column can include any suitable separation device or combination of separation devices. The lights removal distillation column can include a column, e.g., a standard distillation column, an extractive distillation column and/or an azeotropic distillation column. In some cases, the term "lights removal distillation column" refers to multiple distillation columns configured to operate in conjunction with one another.

In some embodiments, the purifying of the reactor output stream includes distillation in a heavies removal distillation column. In cases in which a lights removal distillation is located upstream of the reaction unit operation, the heavies removal distillation column can be fed the reactor output stream exiting the reactor, and can yield a heavies bottoms stream and the product acetonitrile stream. In alternative cases in which a lights removal distillation is located downstream of the reaction unit operation, the heavies removal distillation column can be fed the lights removal bottoms stream exiting the lights removal distillation column, and can yield a heavies bottoms stream and the product acetonitrile stream. The heavies removal distillation column is configured and operated such that the concentration of heavy components such as propionitrile in the product acetonitrile stream is less than in the stream fed to the column, e.g., the lights removal bottoms stream or the reactor output stream.

The concentration of acetonitrile in the product acetonitrile stream can range, for example, from 98 wt % to 99.99 wt %, e.g., from 98 wt % to 99.92 wt %, from 98.82 wt % to 99.95 wt %, from 99.31 wt % to 99.97 wt %, from 99.59 wt % to 99.98 wt %, or from 99.76 wt % to 99.99 wt %. In terms of lower limits, the acetonitrile concentration in the product acetonitrile stream can be greater than 98 wt %, e.g., greater than 98.83 wt %, greater than 99.31 wt %, greater than 99.59 wt %, greater than 99.76 wt %, greater than 99.86 wt %, greater than 99.92 wt %, greater than 99.95 wt %, greater than 99.97 wt %, greater than 99.98 wt %, or greater than 99.99 wt %.

The concentration of acetonitrile in the heavies removal bottoms stream can range, for example, from 3.5 wt % to 45 wt %, e.g., from 3.5 wt % to 16 wt %, from 4.5 wt % to 21 wt %, from 5.8 wt % to 27 wt %, from 7.5 wt % to 35 wt %, or from 9.7 wt % to 54 wt %. In terms of upper limits, the acetonitrile concentration in the heavies removal bottoms stream can be less than 45 wt %, e.g., less than 35 wt %, less than 27 wt %, less than 21 wt %, less than 16 wt %, less than 13 wt %, less than 9.7 wt %, less than 7.5 wt %, less than 5.8 wt %, or less than 4.5 wt %. In terms of lower limits, the acetonitrile concentration in the heavies removal bottoms stream can be greater than 3.5 wt %, e.g., greater than 4.5 wt %, greater than 5.8 wt %, greater than 7.5 wt %, greater than 9.7 wt %, greater than 13 wt %, greater than 16 wt %, greater than 21 wt %, greater than 27 wt %, or greater than 35 wt %. Higher acetonitrile concentrations, e.g., greater than 35 wt %, and lower acetonitrile concentrations, e.g., less than 3.5 wt %, are also contemplated.

The mass ratio of the acetonitrile in the product acetonitrile stream to the acetonitrile in the heavies removal bottoms stream can range, for example, from 4.5:1 to 90:1, e.g., from 4.5:1 to 27:1, from 6.1:1 to 37:1, from 8.2:1 to 49:1, from 11:1 to 67:1, or from 15:1 to 90:1. In terms of upper limits, the mass ratio of acetonitrile in the product acetonitrile stream to the heavies removal bottom stream can be less than 90:1, e.g., less than 67:1, less than 49:1, less than 37:1, less than 27:1, less than 20:1, less than 15:1, less than 11:1, less than 8:1, or less than 6.1:1. In terms or lower limits, the mass ratio of acetonitrile in the product acetonitrile stream to the heavies removal bottoms stream can be greater than 4.5:1, e.g., greater than 6.1:1, greater than 8.2:1, greater than 11:1, greater than 15:1, greater than 20:1, greater than 27:1, greater than 37:1, greater than 49:1, or greater than 67:1. Higher mass ratios, e.g., greater than 90:1, and lower mass ratios, e.g., less than 4.5:1, are also contemplated.

The concentration of propionitrile in the heavies removal bottoms stream can range, for example, from 2 wt % to 35 wt %, e.g., from 2 wt % to 11 wt %, from 2.7 wt % to 15 wt %, from 3.5 wt % to 20 wt %, from 4.7 wt % to 26 wt %, or from 6.3 wt % to 35 wt %. In terms of upper limits, the propionitrile concentration in the heavies removal bottoms stream can be less than 35 wt %, e.g., less than 26 wt %, less than 20 wt %, less than 15 wt %, less than 11 wt %, less than 8.4 wt %, less than 6.3 wt %, less than 4.7 wt %, less than 3.5 wt %, or less than 2.7 wt %. In terms of lower limits, the propionitrile concentration in the heavies removal bottoms stream can be greater than 2 wt %, e.g., greater than 2.7 wt %, greater than 3.5 wt %, greater than 4.7 wt %, greater than 6.3 wt %, greater than 8.4 wt %, greater than 11 wt %, greater than 15 wt %, greater than 20 wt %, or greater than 26 wt %. Higher propionitrile concentrations, e.g., greater than 35 wt %, and lower propionitrile concentrations, e.g., less than 2 wt %, are also contemplated.

In some embodiments, the concentration of allyl alcohol in the heavies removal bottoms stream ranges from 0.75 ppm to 20 ppm, e.g., from 0.75 ppm to 5.4 ppm, from 1 ppm to 7.5 ppm, from 1.4 ppm to 10 ppm, from 2 ppm to 14 ppm, or from 2.8 ppm to 20 ppm. In terms of upper limits, the allyl alcohol concentration in the heavies removal bottoms stream can be less than 20 ppm, e.g., less than 14 ppm, less than 10 ppm, less than 7.5 ppm, less than 5.4 ppm, less than 3.9 ppm, less than 2.8 ppm, less than 2 ppm, less than 1.4 ppm, or less than 1 ppm. In terms of lower limits, the allyl alcohol concentration in the heavies removal bottoms stream can be greater than 0.75 ppm, e.g., greater than 1 ppm, greater than 1.4 ppm, greater than 2 ppm, greater than 2.8 ppm, greater than 3.9 ppm, greater than 5.4 ppm, greater than 7.5 ppm, greater than 10 ppm, or greater than 14 ppm. Higher allyl alcohol concentrations, e.g., greater than 20 ppm, and lower allyl alcohol concentrations, e.g., less than 0.75 ppm, are also contemplated.

In some embodiments, the heavies removal distillation column is operated at a pressure ranging from 50 kPa (gauge) to 150 kPa, e.g., from 60 kPa to 145 kPa, from 75 kPa to 140 kPa, from 80 kPa to 130 kPa, or from 85 kPa to 125 kPa. In terms of upper limits, the heavies removal distillation column operating pressure can be less than 150 kPa, e.g., less than 145 kPa, less than 140 kPa, less than 130 kPa, or less than 125 kPa. In terms of lower limits, the heavies removal distillation column operating pressure can be greater than 50 kPa, e.g., greater than 75 kPa, greater than 80 kPa, greater than 80 kPa, or greater than 90 kPa. Operation at these pressures, in some cases, provides for the aforementioned benefits.

In some embodiments, the heavies removal distillation column is operated at a bottom temperature ranging from 75° C. to 150° C., e.g., from 80° C. to 140° C., from 85° C. to 130° C., from 90° C. to 125° C., from 100° C. to 120° C., or from 105° C. to 115° C. Operation at these temperatures, in some cases, provides for the aforementioned benefits.

In some embodiments, the heavies removal distillation column may be operated with reflux to enhance separation. The reflux ratio may be from 100:1 to 1:100, e.g., from 75:1 to 1:75, from 50:1 to 1:50, from 25:1 to 1:25, from 20:1 to 1:20, from 15:1 to 1:15, from 10:1 to 1:10, from 5:1 to 1:5, or from 3:1 to 1:3. In some embodiments, the reflux ratio may be from 50:1 to 1:1, e.g., from 25:1 to 1:1, from 15:1 to 1:1, or from 5:1 to 1:1.

Digestion

In some embodiments, the provided separation process further includes treatment of an intermediate stream to remove at least a portion of the hydrogen cyanide from the intermediate stream, producing the feedstock stream. The intermediate stream can include one or more waste streams from other industrial chemical processes, e.g., the production of acrylonitrile, allyl cyanide, butyronitrile, polyacrylonitrile, polyamides, polyaramids, or combinations thereof. For example, waste streams from multiple processes for producing organic nitriles or derivatives thereof can be combined to form the intermediate stream. In some embodiments, the intermediate stream includes one or more waste streams, e.g., purge streams, from an acrylonitrile production process.

In some embodiments, the treating includes digesting the intermediate stream in a digester that is fed a strong base and the feedstock stream. In some embodiments, the strong base includes one or more metal hydroxides. The strong base can include, for example, sodium hydroxide, potassium hydroxide, magnesium hydroxide, calcium hydroxide, or a combination thereof. In some embodiments, the one or more metal hydroxides include sodium hydroxide. In some embodiments, the digester is fed another caustic solution in addition to or in place of the strong base. The other caustic solution can include, for example, one or more aldehydes. In some embodiments, the one or more aldehydes include formaldehyde.

In some embodiments, the concentration of hydrogen cyanide in the intermediate stream ranges from 0.1 to 2.5 wt %, e.g., from 0.1 to 0.69 wt %, from 0.14 wt % to 0.95 wt %, from 0.19 wt % to 1.3 wt %, from 0.26 wt % to 1.8 wt %, or from 0.36 wt % to 2.5 wt %. In terms of upper limits, the hydrogen cyanide concentration in the intermediate stream can be less than 2.5 wt %, e.g., less than 1.8 wt %, less than 1.3 wt %, less than 0.95 wt %, less than 0.69 wt %, less than 0.5 wt %, less than 0.36 wt %, less than 0.26 wt %, less than 0.19 wt %, or less than 0.14 wt %. In terms of lower limits, the hydrogen cyanide concentration in the intermediate stream can be greater than 0.1 wt %, e.g., greater than 0.14 wt %, greater than 0.19 wt %, greater than 0.26 wt %, greater than 0.36 wt %, greater than 0.5 wt %, greater than 0.69 wt %, greater than 0.95 wt %, greater than 1.3 wt %, or greater than 1.8 wt %. Higher hydrogen cyanide concentrations, e.g., greater than 2.5 wt %, and lower hydrogen cyanide concentrations, e.g., less than 0.1 wt %, are also contemplated.

In some embodiments, the mass ratio of the hydrogen cyanide in the intermediate stream to the hydrogen cyanide in the feedstock stream ranges from 5:1 to 100:1, e.g., from 5:1 to 30:1, from 6.7:1 to 41:1, from 9.1:1 to 55:1, from 12:1 to 74:1, or from 17:1 to 100:1. In terms of upper limits, the mass ratio of the hydrogen cyanide in the intermediate stream to the feedstock stream can be less than 100:1, e.g., less than 74:1, less than 55:1, less than 41:1, less than 30:1, less than 22:1, less than 17:1, less than 12:1, less than 9.1:1, or less than 6.7:1. In terms of lower limits, the mass ratio of the hydrogen cyanide in the intermediate stream to the feedstock stream can be greater than 5:1, e.g., greater than 6.7:1, greater than 9.1:1, greater than 12:1, greater than 17:1, greater than 22:1, greater than 30:1, greater than 41:1, greater than 55:1, or greater than 74:1. Higher mass ratios, e.g., greater than 100:1, and lower mass ratios, e.g., less than 5:1, are also contemplated.

In some cases, the component concentrations of the intermediate stream are similar to those of the feedstock stream, plus the hydrogen cyanide to be removed in the treating of the intermediate stream, and the aforementioned feedstock stream component ranges and limits are applicable. These component concentrations can be easily calculated by one of ordinary skill in the art.

EXAMPLES

The present disclosure will be better understood in view of the following non-limiting examples. The following examples are intended for illustrative purposes only and do not limit in any way the scope of the present disclosure.

Figure 1:
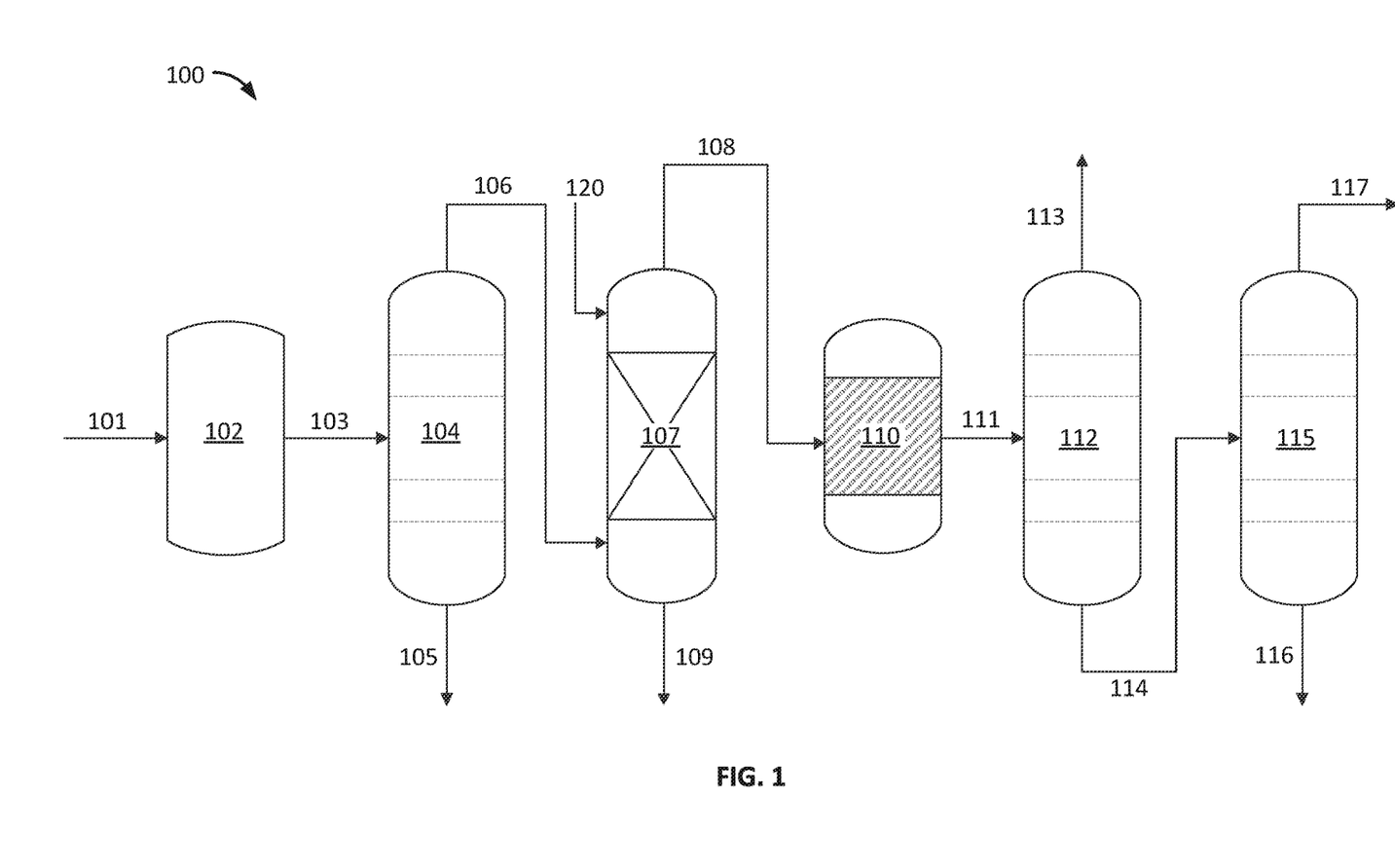
FIG. 1 is a schematic illustration of a process for recovering acetonitrile in accordance with an embodiment.

FIG. 1 illustrates an exemplary separation scheme 100. As shown in the scheme, intermediate stream 101 is fed to a digester 102. The composition of the intermediate stream is shown in Table 1, and includes acetonitrile, methanol, hydrogen cyanide (HCN), water, allyl alcohol, oxazole, propionitrile, acrylonitrile, and acetone. The digester treats the intermediate stream to remove hydrogen cyanide and produce a feedstock stream 103. The composition of the feedstock stream is shown in Table 1.

The feedstock stream 103 is fed to a dehydration distillation column 104. Dehydration distillation column 104 operates at a temperature of about 80° C. (175° F.) and under vacuum (−60 kPa (gauge)). Distillation of the feedstock stream in the dehydration distillation column yields a dehydration bottoms stream 105 and a dehydration distillate stream 106. The reflux ratio is 0.4:1. The composition of the first bottoms stream is shown in Table 1, and includes water, methanol, and allyl alcohol from the feedstock stream. The composition of the dehydration distillate stream is shown in Table 1, and includes acetonitrile, methanol, water, allyl alcohol, oxazole, propionitrile, acrylonitrile, and acetone from the feedstock stream.

The dehydration distillate stream 106 is fed to extractor 107. Extraction of the dehydration distillate stream in the extractor yields a raffinate stream 108 and an extract stream 109. Caustic is fed to extractor 107 via caustic feed line 120. The composition of the extract stream is shown in Table 1, and includes water, hydroxypropionitrile, and acrylonitrile from the dehydration distillate stream. The composition of the raffinate stream is shown in Table 1, and includes acetonitrile, allyl alcohol, methanol, oxazole, propionitrile, and acetone from the dehydration distillate stream.

The raffinate stream 108 serves as the dehydrated stream fed to reactor 110. Reaction of the dehydrated stream in the reactor yields reactor output stream 111. The composition of the reactor output stream is shown in Table 1, and includes acetonitrile, methanol, propionitrile, and acetone from the dehydrated stream.

The reactor output stream 111 is fed to a lights removal distillation column 112. Lights removal distillation column 112 operates at a temperature of about 90° C. (195° F.) and a pressure of 35 kPa (gauge). Distillation of the reactor output stream in the lights removal distillation column yields a lights removal distillate stream 113 and a lights removal bottoms stream 114. The reflux ratio is 25:1. The composition of the lights removal distillate stream is shown in Table 1, and includes methanol and acetone from the reactor output stream. The composition of the lights removal bottoms stream is shown in Table 1, and includes acetonitrile from the reactor output stream.

The lights removal bottoms stream 114 is fed to a heavies removal distillation column 115. This column operates at a temperature of about 107° C. (225° F.), a pressure of 100 kPa (gauge) and a reflux ratio of 1.5:1. Distillation of the lights removal bottoms stream in the heavies removal distillation column yields a heavies removal bottoms stream 116 and a product acetonitrile stream 117. The composition of the heavies removal bottoms stream is shown in Table 1, and includes propionitrile from the lights removal bottoms stream. The composition of the products acetonitrile stream is shown in Table 1.

Figure 2:
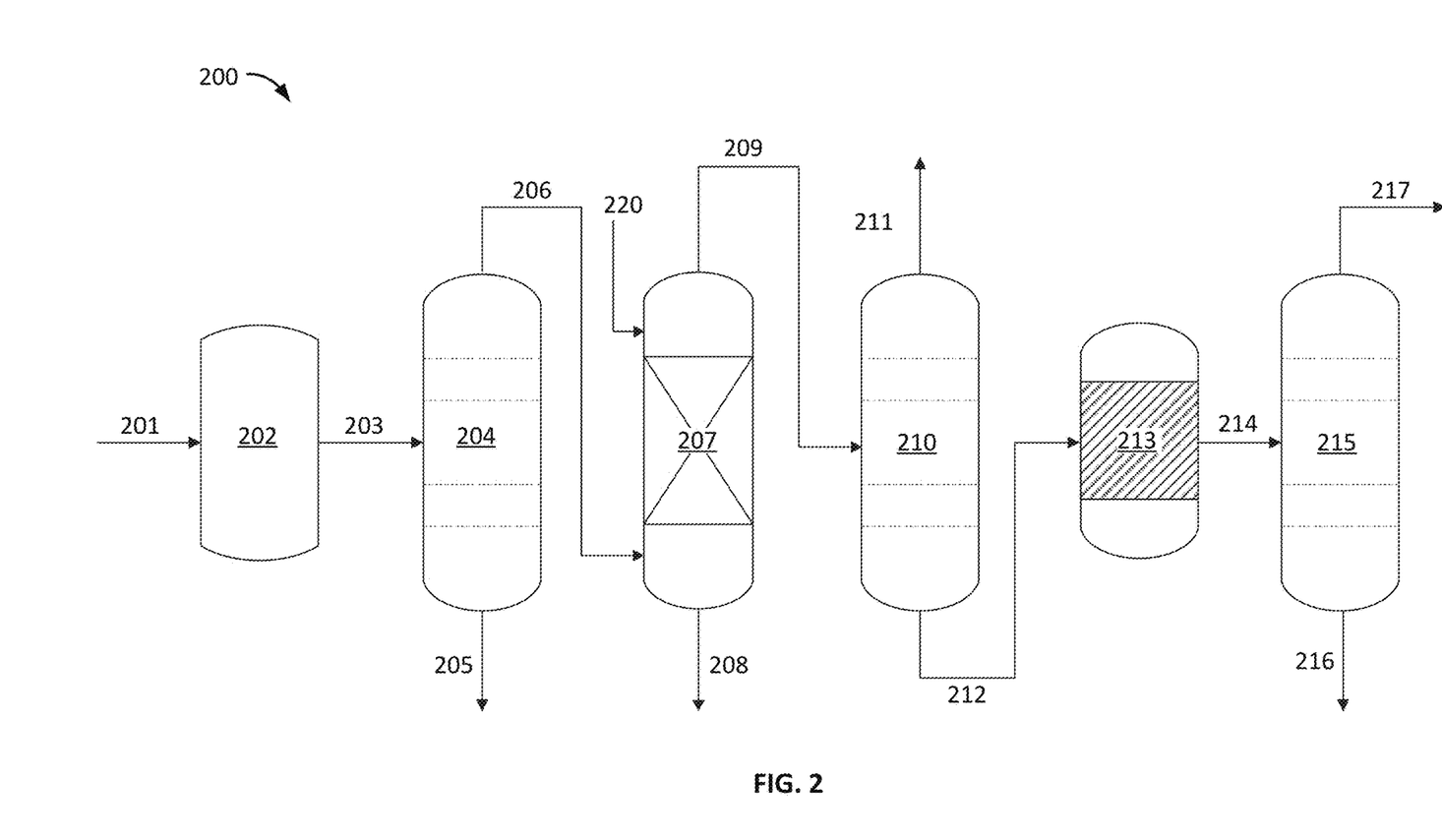
FIG. 2 is a schematic illustration of a process for recovering acetonitrile in accordance with an embodiment.

FIG. 2 illustrates another exemplary separation scheme 200. As shown in the scheme, intermediate stream 201 is fed to a digester 202. The composition of the intermediate stream includes acetonitrile, methanol, hydrogen cyanide (HCN), water, allyl alcohol, oxazole, propionitrile, acrylonitrile, and acetone. The digester treats the intermediate stream to remove hydrogen cyanide and produce a feedstock stream 203.

The feedstock stream 203 is fed to a dehydration distillation column 204. Distillation of the feedstock stream in the dehydration distillation column yields a dehydration bottoms stream 205 and a dehydration distillate stream 206. The composition of the first bottoms stream includes water, methanol, and allyl alcohol from the feedstock stream. The composition of the dehydration distillate stream includes acetonitrile, methanol, water, allyl alcohol, oxazole, propionitrile, acrylonitrile, and acetone from the feedstock stream.

The dehydration distillate stream 206 is fed to an extractor 207. Extraction of the dehydration distillate stream in the extractor yields an extract stream 208 and a raffinate stream 209. The composition of the extract stream includes water and acrylonitrile from the dehydration distillate stream. The composition of the raffinate stream includes acetonitrile, allyl alcohol, methanol, oxazole, propionitrile, and acetone from the dehydration distillate stream.

The raffinate stream 209 is fed to a lights removal distillation column 210. Distillation of the raffinate stream in the lights removal distillation column yields a lights removal distillate stream 211 and a lights removal bottoms stream 212. The composition of the lights removal distillate stream includes methanol and acetone from the reactor output stream. The composition of the lights removal bottoms stream is shown in Table 1, and includes acetonitrile, allyl alcohol, oxazole, propionitrile, and acetone from the reactor output stream.

The lights removal bottoms stream 212 serves as the dehydrated stream fed to reactor 213. Reaction of the dehydrated stream in the reactor yields reactor output stream 214. The composition of the reactor output stream includes acetonitrile and propionitrile from the dehydrated stream.

The reactor output stream 214 is fed to a heavies removal distillation column 215. Distillation of the reactor output stream in the heavies removal distillation column yields a heavies removal bottoms stream 216 and a product acetonitrile stream 217. The composition of the heavies removal

TABLE 1

Stream compositions of FIG. 1 separation process.

| Component | 101 | 103 | 105 | 106 | 108 | 109 | 111 | 113 | 114 | 116 | 117 |
|---|---|---|---|---|---|---|---|---|---|---|---|
| HCN | 0.56 | 0.02 | | 0.55 | | | | | | | |
| Acetone | 0.04 | 0.04 | | 0.32 | 0.38 | | 0.36 | 1.82 | | | |
| Methanol | 3.28 | 3.17 | 2.17 | 10.38 | 12.53 | | 11.67 | 60.18 | | | |
| Oxazole | 0.44 | 0.43 | | 3.46 | 4.18 | | | | | | |
| Acrylonitrile | 0.22 | 0.21 | | 1.74 | | 5.5 | | | | | |
| Acetonitrile | 8.00 | 7.73 | 0.09 | 62.94 | 75.99 | | 70.74 | 36.54 | 78.96 | 14.88 | 99.95 |
| Allyl Alcohol | 0.22 | 0.21 | 0.15 | 0.67 | 0.81 | | | | | | |
| Protonated Salts | | | | | | | ~0.74 | | | | |
| Oxazole sulfate | | | | | | | ~4.0 | | | | |
| OH propionitrile | | | | | | ~0.2 | | | | | |
| Propionitrile | 0.22 | 0.21 | | 1.75 | 2.11 | | 1.97 | 0.06 | 2.42 | 9.78 | |
| Water | 83.74 | 83.79 | 93.29 | 15.00 | 0.14 | 71.1 | | | | | |
| Other impurities | 3.28 | 4.18 | 4.30 | 3.19 | 3.85 | 23.17 | 10.54 | 1.39 | 18.81 | 75.30 | 0.05 |

EMBODIMENTS

The following embodiments are contemplated. All combinations of features and embodiments are contemplated.

Embodiment 1: A process for producing acetonitrile, the process comprising: dehydrating a feedstock stream comprising acetonitrile, allyl alcohol, and water to produce a dehydrated stream comprising allyl alcohol and less than 1 wt % water; reacting allyl alcohol from the dehydrated stream with a strong acid in a reactor to yield a reactor output stream, and purifying the reactor output stream to yield a product acetonitrile stream.

Embodiment 2: An embodiment of embodiment 1, wherein the feedstock stream comprises more than 0.02 wt % allyl alcohol, and wherein the reactor output stream comprises less than 7 ppm allyl alcohol.

Embodiment 3: An embodiment of embodiment 1 or 2, wherein allyl alcohol in the dehydrated stream reacts with the strong acid to form protonated salt species.

Embodiment 4: An embodiment of any of the embodiments of embodiment 1-3, wherein the dehydrated stream further comprises oxazole.

Embodiment 5: An embodiment of any of the embodiments of embodiment 1-4, wherein oxazole in the dehydrated stream reacts with the strong acid to form oxazole sulfate.

Embodiment 6: An embodiment of any of the embodiments of embodiment 1-5, wherein the reactor output stream comprises greater than 0.1 wt % protonated salt species and/or wherein the reactor output stream comprises greater than 0.1 wt % oxazole sulfate.

Embodiment 7: An embodiment of any of the embodiments of embodiment 1-6, wherein the feedstock stream comprises more than 38 wt % water.

Embodiment 8: An embodiment of any of the embodiments of embodiment 1-7, wherein the dehydrated stream comprises less than 0.4 wt % water.

Embodiment 9: An embodiment of any of the embodiments of embodiment 1-8, wherein the strong acid comprises sulfuric acid.

Embodiment 10: An embodiment of any of the embodiments of embodiment 1-9, wherein the mass ratio of the acetonitrile to the water in the dehydrated stream is greater than 60:1.

Embodiment 11: An embodiment of any of the embodiments of embodiment 1-10, wherein the mass ratio of the acetonitrile to allyl alcohol in the reactor output stream is greater than 100,000:1.

Embodiment 12: An embodiment of any of the embodiments of embodiment 1-11, wherein the extract stream comprises greater than 0.01 wt % hydroxypropionitrile.

Embodiment 13: An embodiment of any of the embodiments of embodiment 1-12, wherein the dehydrating comprises: distilling the feedstock stream in a dehydration distillation column to yield a dehydration distillate stream and a dehydration bottoms stream.

Embodiment 14: An embodiment of any of the embodiments of embodiment 1-13, wherein the dehydration distillation column is operated at a pressure less than 85 kPa.

Embodiment 15: An embodiment of any of the embodiments of embodiment 1-14, wherein the dehydrating further comprises: extracting the dehydration distillate stream to yield an extract stream and a raffinate stream.

Embodiment 16: An embodiment of any of the embodiments of embodiment 1-15, wherein the raffinate stream comprises more than 0.08 wt % allyl alcohol.

Embodiment 17: An embodiment of any of the embodiments of embodiment 1-16, wherein the raffinate stream comprises more than 0.4 wt % oxazole.

Embodiment 18: An embodiment of any of the embodiments of embodiment 1-17, further comprising: treating an intermediate stream comprising acetonitrile, hydrogen cyanide, and water in a digester to remove hydrogen cyanide and produce the feedstock stream.

Embodiment 19: An embodiment of any of the embodiments of embodiment 1-18, wherein sodium hydroxide is fed to the digester.

Embodiment 20: An embodiment of any of the embodiments of embodiment 1-19, wherein the feedstock stream comprises less than 0.2 wt % hydrogen cyanide.

Embodiment 21: An embodiment of any of the embodiments of embodiment 1-20, wherein the raffinate stream is the dehydrated stream.

Embodiment 22: An embodiment of any of the embodiments of embodiment 1-21, wherein the purifying comprises: distilling the reactor output stream in a lights removal distillation column to yield a lights removal distillate stream and a lights removal bottoms stream.

Embodiment 23: An embodiment of any of the embodiments of embodiment 1-22, wherein the purifying further comprises: distilling the lights removal bottoms stream in a heavies removal distillation column to yield the product acetonitrile stream.

Embodiment 24: An embodiment of any of the embodiments of embodiment 1-23, wherein the feedstock stream and the lights removal distillate stream comprise methanol.

Embodiment 25: An embodiment of any of the embodiments of embodiment 1-24, wherein the lights removal distillate stream comprises more than 15 wt % methanol.

Embodiment 26: An embodiment of any of the embodiments of embodiment 1-25, wherein the product acetonitrile stream comprises more than 98 wt % acetonitrile.

Embodiment 27: An embodiment of any of the embodiments of embodiment 1-26, wherein the feedstock stream further comprises propionitrile.

Embodiment 28: A process for producing acetonitrile, the process comprising: distilling a feedstock stream comprising acetonitrile, allyl alcohol, and water in a dehydration distillation column to yield a dehydration distillate stream and a dehydration bottoms stream; extracting the dehydration distillate stream to yield an extract stream and a raffinate stream; distilling the raffinate stream in a lights removal distillation column to yield a lights removal distillate stream and a lights removal bottoms stream comprising allyl alcohol and less than 1 wt % water; reacting allyl alcohol from the lights removal bottoms stream with a strong acid in a reactor to yield a reactor output stream comprising less than 7 ppm allyl alcohol; and purifying the reactor output stream to yield a product acetonitrile stream comprising greater than 98 wt % acetonitrile.

Embodiment 29: An embodiment of embodiment 28, further comprising: treating an intermediate stream comprising acetonitrile, hydrogen cyanide, and water in a digester to remove hydrogen cyanide and produce the feedstock stream.

Embodiment 30: An embodiment of embodiment 28 or 29, wherein the purifying comprises: distilling the reactor output stream in a heavies removal distillation column to yield the product acetonitrile stream.

While the disclosure has been described in detail, modifications within the spirit and scope of the disclosure will be readily apparent to those of skill in the art in view of the foregoing discussion, relevant knowledge in the art, and references discussed above in connection with the Background and Detailed Description, the disclosures of which are all incorporated herein by reference. In addition, it should be understood that aspects of the disclosure and portions of various embodiments and various features recited below and/or in the appended claims may be combined or interchanged either in whole or in part. In the foregoing descriptions of the various embodiments, those embodiments which refer to another embodiment may be appropriately combined with other embodiments as will be appreciated by one of skill in the art. Furthermore, those of ordinary skill in the art will appreciate that the foregoing description is by way of example only, and is not intended to limit the invention.

We claim:

1. A process for producing acetonitrile, the process comprising:
    distilling a feedstock stream in a dehydration distillation column to yield a dehydration distillate stream and a dehydration bottoms stream, wherein the feedstock stream comprises acetonitrile, acrylonitrile, allyl alcohol, and water and the dehydration distillate stream is collected as the top stream from the dehydration distillation column;
    extracting the dehydration distillate stream with a caustic to hydrolyze acrylonitrile and yield an extract stream comprising water and from 0.01 wt % to 5.0 wt % of hydroxypropionitrile and a raffinate stream comprising allyl alcohol and less than 1 wt % water;
    reacting allyl alcohol in the raffinate stream with a strong acid in a reactor to yield a reactor output stream;
    distilling the reactor output stream in a lights removal distillation column to yield a lights removal distillate stream and a lights removal bottoms stream; and
    distilling the lights removal bottoms stream in a heavies removal distillation column to yield a product acetonitrile stream containing more than 98 wt % acetonitrile.

2. The process of claim 1, wherein the feedstock stream comprises more than 0.02 wt % allyl alcohol, and wherein the reactor output stream comprises less than 7 ppm allyl alcohol.

3. The process of claim 1, wherein allyl alcohol in the raffinate stream reacts with the strong acid to form a protonated salt species.

4. The process of claim 1, wherein the raffinate stream further comprises oxazole, wherein oxazole in the raffinate stream reacts with the strong acid to form oxazole sulfate.

5. The process of claim 4, wherein the reactor output stream comprises greater than 0.01 wt % protonated salt species and/or greater than 0.1 wt % oxazole sulfate.

6. The process of claim 1, wherein the feedstock stream comprises more than 38 wt % water and wherein the raffinate stream comprises less than 0.4 wt % water.

7. The process of claim 1, wherein the strong acid comprises sulfuric acid.

8. The process of claim 1, wherein the mass ratio of the acetonitrile to the water in the raffinate stream is greater than 60:1.

9. The process of claim 1, wherein the mass ratio of the acetonitrile to allyl alcohol in the reactor output stream is greater than 100,000:1.

10. The process of claim 1, wherein the dehydration distillation column is operated at a pressure less than 85 kPa.

11. The process of claim 1, wherein the raffinate stream comprises more than 0.08 wt % allyl alcohol and/or more than 0.4 wt % oxazole.

12. The process of claim 1, wherein the feedstock stream and the lights removal distillate stream comprise methanol.

13. The process of claim 1, wherein the lights removal distillate stream comprises more than 15 wt % methanol.

14. A process for producing acetonitrile, the process comprising:
    distilling a feedstock stream comprising acetonitrile, acrylonitrile, allyl alcohol, and water in a dehydration distillation column to yield a dehydration distillate stream and a dehydration bottoms stream, the dehydration distillate stream being collected as the top stream from the dehydration distillation column;
    extracting the dehydration distillate stream with a caustic to hydrolyze acrylonitrile to yield an extract stream comprising water and from 0.01 wt % to 5.0 wt % of hydroxypropionitrile and a raffinate stream comprising allyl alcohol and less than 1 wt % water;
    distilling the raffinate stream in a lights removal distillation column to yield a lights removal distillate stream and a lights removal bottoms stream comprising allyl alcohol and less than 1 wt % water;
    reacting allyl alcohol from the lights removal bottoms stream with a strong acid in a reactor to yield a reactor output stream comprising less than 7 ppm allyl alcohol;
    and distilling the reactor output stream in a heavies removal distillation column purifying the reactor output stream to yield a product acetonitrile stream comprising greater than 98 wt % acetonitrile.

15. The process of claim 14, further comprising:
    treating an intermediate stream comprising acetonitrile, hydrogen cyanide, and water in a digester to remove hydrogen cyanide and produce the feedstock stream.

16. The process of claim 1, wherein the distilling of the feedstock stream in the dehydration distillation column comprises distilling the feedstock at temperatures ranging from 60° C. to 85° C.

* * * * *